US012058563B2

(12) United States Patent
Jangid et al.

(10) Patent No.: US 12,058,563 B2
(45) Date of Patent: *Aug. 6, 2024

(54) USER EQUIPMENT (UE) AND CORE NETWORK FOR MANAGING NETWORK SLICE CONGESTION IN WIRELESS COMMUNICATION SYSTEM

(71) Applicant: Samsung Electronics Co., Ltd., Suwon-si (KR)

(72) Inventors: Alok Kumar Jangid, Bangalore (IN); Danish Ehsan Hashmi, Bangalore (IN); Govind Irappa Uttur, Bangalore (IN); Kailash Kumar Jha, Bangalore (IN); Lalith Kumar, Bangalore (IN); Sung-hoon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,360

(22) Filed: Jan. 17, 2023

(65) Prior Publication Data

US 2023/0247479 A1 Aug. 3, 2023

Related U.S. Application Data

(63) Continuation of application No. 16/755,766, filed as application No. PCT/KR2018/012131 on Oct. 15, 2018, now Pat. No. 11,558,774.

(30) Foreign Application Priority Data

Oct. 13, 2017 (IN) .............................. 201741036546
Oct. 12, 2018 (IN) ............................ 2017 41036546

(51) Int. Cl.
*H04W 28/02* (2009.01)
*H04W 48/06* (2009.01)
*H04W 76/18* (2018.01)

(52) U.S. Cl.
CPC ....... *H04W 28/0289* (2013.01); *H04W 48/06* (2013.01); *H04W 76/18* (2018.02)

(58) Field of Classification Search
CPC .. H04W 28/0289; H04W 76/18; H04W 48/06
See application file for complete search history.

(56) References Cited

U.S. PATENT DOCUMENTS 8,369,253 B2 2/2013 Faccin et al.
9,047,648 B1 6/2015 Lekutai et al.
(Continued)

FOREIGN PATENT DOCUMENTS

CN 102860090 A 1/2013
CN 102868634 A 1/2013
(Continued)

OTHER PUBLICATIONS

European Notice of Allowance dated Feb. 7, 2023, issued in European Patent Application No. 18865779.5.
(Continued)

*Primary Examiner* — Melvin C Marcelo
(74) *Attorney, Agent, or Firm* — Jefferson IP Law, LLP

(57) ABSTRACT

Embodiments herein provide a wireless communication system for managing a network slice congestion. The wireless communication system includes a User Equipment (UE), operably coupled to a core network. The UE is configured to transmit a first NAS signaling message to the core network, wherein the first NAS signaling message comprises a specific network slide identity. The core network i configured to detect the network slice congestion in the wireless communication system. Further, the core net-
(Continued)

work is configured to indicate the network slice congestion using a second NAS signaling message to the User Equipment (UE), wherein the second NAS signaling message comprising a reject cause value and a back off timer for the requested network slice identity.

10 Claims, 30 Drawing Sheets

(56) References Cited

U.S. PATENT DOCUMENTS

| | | |
|---|---|---|
| 2010/0048160 A1 | 2/2010 | Lekutai |
| 2010/0317317 A1 | 12/2010 | Maier et al. |
| 2011/0019587 A1 | 1/2011 | Wang |
| 2013/0029631 A1 | 1/2013 | Tiwari |
| 2014/0206352 A1 | 7/2014 | Mochizuki et al. |
| 2016/0128020 A1 | 5/2016 | Agarwal et al. |
| 2017/0142591 A1 | 5/2017 | Vrzic |
| 2017/0164349 A1 | 6/2017 | Zhu et al. |
| 2017/0278378 A1 | 9/2017 | Kaplita et al. |
| 2018/0310190 A1 | 10/2018 | Dash et al. |
| 2019/0028887 A1 | 1/2019 | Ryu et al. |
| 2019/0075578 A1 | 3/2019 | Kim |
| 2019/0174449 A1 | 6/2019 | Shan et al. |
| 2019/0306899 A1 | 10/2019 | Kuge et al. |
| 2019/0335532 A1 | 10/2019 | Kim et al. |
| 2019/0357116 A1 | 11/2019 | Huang-Fu et al. |
| 2020/0077250 A1 | 3/2020 | Gideon, III |
| 2020/0153796 A1 | 5/2020 | Lin |
| 2020/0252780 A1 | 5/2020 | McClendon, IV et al. |
| 2020/0187150 A1 | 6/2020 | Eisner |
| 2020/0275506 A1 | 8/2020 | Niemi et al. |
| 2020/0336964 A1 | 10/2020 | Kawasaki et al. |
| 2020/0359348 A1 | 11/2020 | Kumar et al. |
| 2020/0367153 A1 | 11/2020 | Sen et al. |
| 2021/0084443 A1 | 3/2021 | Wang et al. |
| 2021/0092634 A1 | 3/2021 | Kang |

FOREIGN PATENT DOCUMENTS

| | | |
|---|---|---|
| CN | 102870479 A | 1/2013 |
| CN | 105659634 A | 6/2016 |
| CN | 106549806 A | 3/2017 |
| CN | 106982458 A | 7/2017 |
| CN | 107113195 A | 8/2017 |
| EP | 3 654 692 A1 | 5/2020 |
| EP | 3 278 504 B1 | 11/2020 |
| KR | 10-2017-0106624 A | 9/2017 |
| WO | 2017/080517 A1 | 5/2017 |
| WO | 2017126884 A1 | 7/2017 |
| WO | 2017/143047 A1 | 8/2017 |
| WO | 2017/147271 A1 | 8/2017 |
| WO | 2017/171348 A2 | 10/2017 |
| WO | 2018/034924 A1 | 2/2018 |

OTHER PUBLICATIONS

Chinese Office Action dated Feb. 27, 2023, issued in Chinese Patent Application No. 201880078274.9.
Samsung, TS 23.501: Reject Slices, S2-175774, 3GPP TSG SA WG2 Meeting #122bis, Sophia Antipolis, France, Aug. 15, 2017.
Samsung, Several corrections to clause on Registration to a Set of Network Slices, S2-174666, 3GPP TSG SA WG2 Meeting #122, San Jose Del Cabo, Mexico, Jun. 20, 2017.
Samsung et al., 5GC-EPC Interworking for a dual-registration UE, S2-174688, 3GPP TSG SA WG2 Meeting #122, San Jose Del Cabo, Mexico, Jun. 20, 2017.
Samsung et al., Interworking procedure for a dual-registration UE: 5GC to EPC mobility, S2-174694, 3GPP TSG SA WG2 Meeting #122, San Jose Del Cabo, Mexico, Jun. 20, 2017.
NTT Docomo, "No-N26 Interworking Procedures", 3GPP Draft, S2-175739, SA WG2 Meeting #122bis, Aug. 21-25, 2017, Sofia-Antipolis, France, Aug. 21, 2017, XP051325588.
NTT Docomo, "No-Nx Interworking Procedures", 3GPP Draft, S2-175156, SA WG2 Meeting #122, Jun. 26-30, 2017, Cabo, Mexico, Jul. 3, 2017, XP051310145.
NTT Docomo, "Interworking between NGC and EPC", 3GPP Draft, S2-170934, Feb. 13, 2017, XP051217054.
Indian Office Action dated Feb. 16, 2021, issued in Indian Patent Application No. 201741036546.
Indian Office Action dated Feb. 16, 2021, issued in Indian Patent Application No. 201842038766.
Extended European Search Report dated Jul. 30, 2020, issued in European Patent Application No. 18865779.5.
Huawei et al., "UE Slice Association/Overload control Procedure", S2-162981, 3GPP TSG SA WG2 Meeting #115, Nanjing, China, May 23, 2016-May 27, 2016, May 27, 2016.
European Search Report dated May 21, 2021, issued in European Patent Application No. 18866020.3.
Chinese Office Action dated Dec. 3, 2021, issued in a counterpart Chinese Application No. 201880038761.2.
Intel; Avoidance of TAU failure in interworking without N26 interface for SR-mode UE; SA WG2 Meeting #122bis S2-175886; Aug. 2017, Sophia Antipolis, France.
European Office Action dated Nov. 24, 2022, issued in a counterpart European Application No. 18866020.3.
U.S. Office Action dated Dec. 7, 2022, issued by the U.S. Patent and Trademark Office U.S. Appl. No. 17/403,281.
NTT Docomo, Update of Network Slicing Solution 1.3, SA WG2 Meeting #116-BIS, S2-164523, Aug. 23, 2016.
Chinese Notice of Allowance dated Aug. 1, 2023, issued in Chinese Patent Application No. 201880078274.9.
Korean Office Action dated Sep. 26, 2023, issued in Korean Patent Application No. 10-2020-7012743.
Extended European Search Report dated Sep. 6, 2023, issued in European Patent Application No. 23181877.4.
Korean Office Action dated Feb. 14, 2024, issued in Korean Patent Application No. 10-2020-7010690.
3rd Generation Partnership Project; Technical Specification Group Services and System Aspects; System Architecture for the 5G System; Stage 2 (Release 15), 3GPP Standard; Technical Specification; 3GPP TS 23.501 V1.4.0 (Sep. 2017), Sep. 28, 2017, pp. 1-152.
European Office Action dated Jun. 3, 2024, issued in European Patent Application No. 18866020.3.

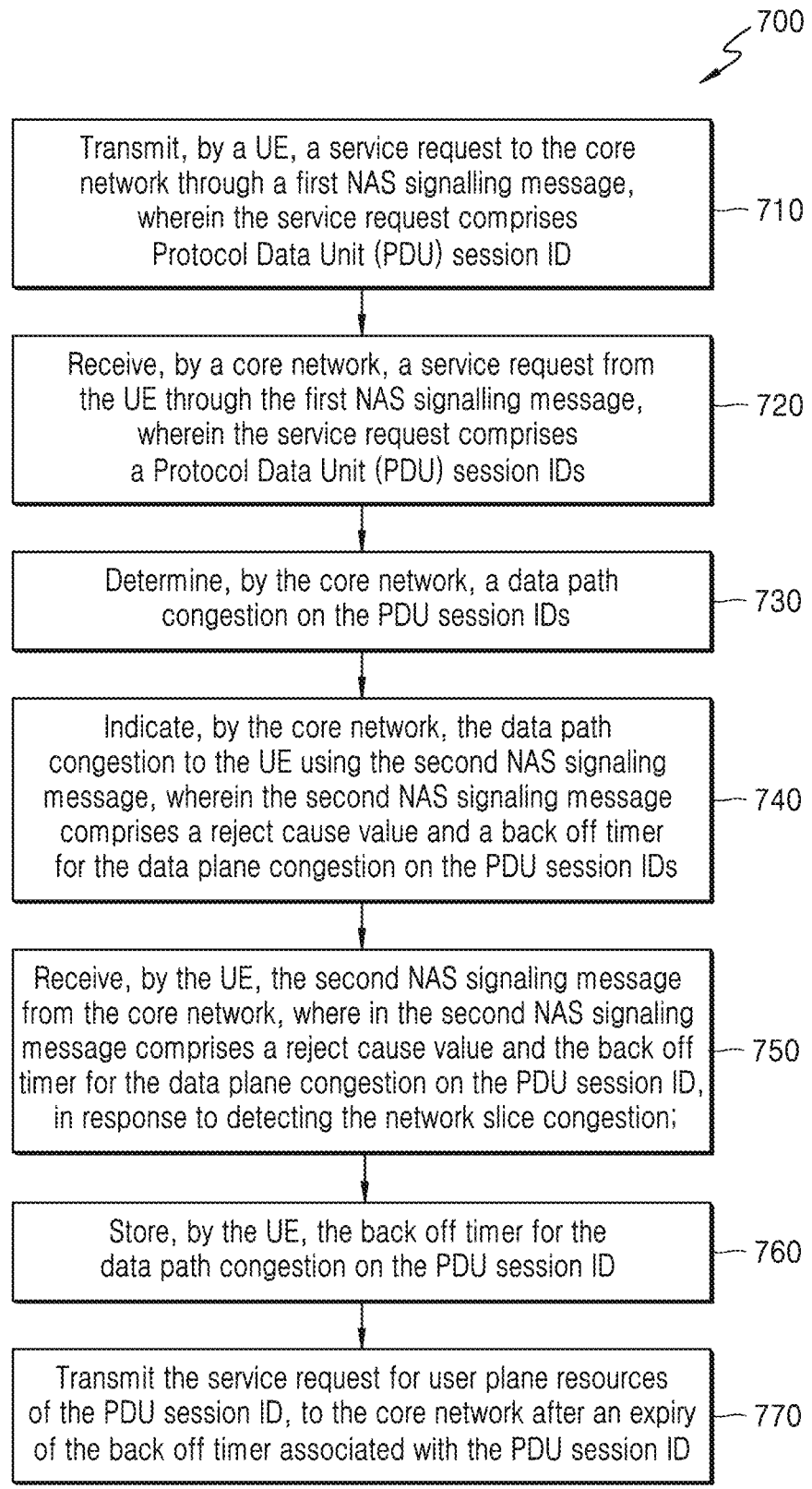

USER EQUIPMENT (UE) AND CORE NETWORK FOR MANAGING NETWORK SLICE CONGESTION IN WIRELESS COMMUNICATION SYSTEM

CROSS-REFERENCE TO RELATED APPLICATION(S)

This application is a continuation application of prior application Ser. No. 16/755,766 filed on Apr. 13, 2020, which has issued as U.S. Pat. No. 11,558,774 on Jan. 17, 2023; and which is a U.S. National Stage application under 35 U.S.C. § 371 of an International application number PCT/KR2018/012131, filed on Oct. 15, 2018, which is based on and claims priority of an Indian Provisional patent application number 201741036546, filed on Oct. 13, 2017, in the Indian Intellectual Property Office, and of an Indian Complete patent application number 201741036546, filed on Oct. 12, 2018, in the Indian Intellectual Property Office, the disclosure of each of which is incorporated by reference herein in its entirety.

TECHNICAL FIELD

The embodiment herein relates to a wireless communication system, and more particularly relates to a User Equipment (UE) and core network for managing network slice congestion in the wireless communication system.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE

Technical Solution

The principal object of the embodiments herein is to provide a User Equipment (UE) and a core network for managing network slice congestion in a wireless communication system.

Another object of the embodiments herein is to indicate the network slice congestion using a second NAS signaling message to the User Equipment (UE), wherein the NAS signaling message comprising a reject cause value and a back off timer for the requested network slice identity.

Another object of the embodiments herein is to perform a retransmission of a first NAS signaling message, once the back off timer is expired.

Another object of the embodiments herein is to determine data path congestion on the PDU session IDs.

Another object of the embodiments herein is to indicate the data path congestion to the UE using the second NAS signaling message, wherein the NAS signaling message comprises a reject cause value and a back off timer for the data plane congestion on the PDU session IDs.

Another object of the embodiments herein is to store the back off timer for the data path congestion on the PDU session ID.

Another object of the embodiments herein is to transmit the service request for user plane resources of the PDU session ID, to the core network after an expiry of the back off timer associated with the PDU session ID.

Another object of the embodiments herein is to provide a method and system for maintaining service continuity by the User Equipment (UE) in the wireless communication system.

Another object of the embodiments herein is to detect a change in location during a mobility of the UE from a first radio access technology to a second radio access technology.

Another object of the embodiments herein is to initiate an attach request procedure with other registered RAT information for maintaining the service continuity.

Another object of the embodiments herein is to operate the UE in a dual registration even a registration accept message indicates the UE to support the single registration.

DESCRIPTION OF DRAWINGS

The embodiments herein will be better understood from the following detailed description with reference to the drawings, in which:

FIG. 7 is a flow diagram illustrating various operations for maintaining a data path congestion in the wireless communication system, according to an embodiment as disclosed herein;

BEST MODE

Figure 1A:
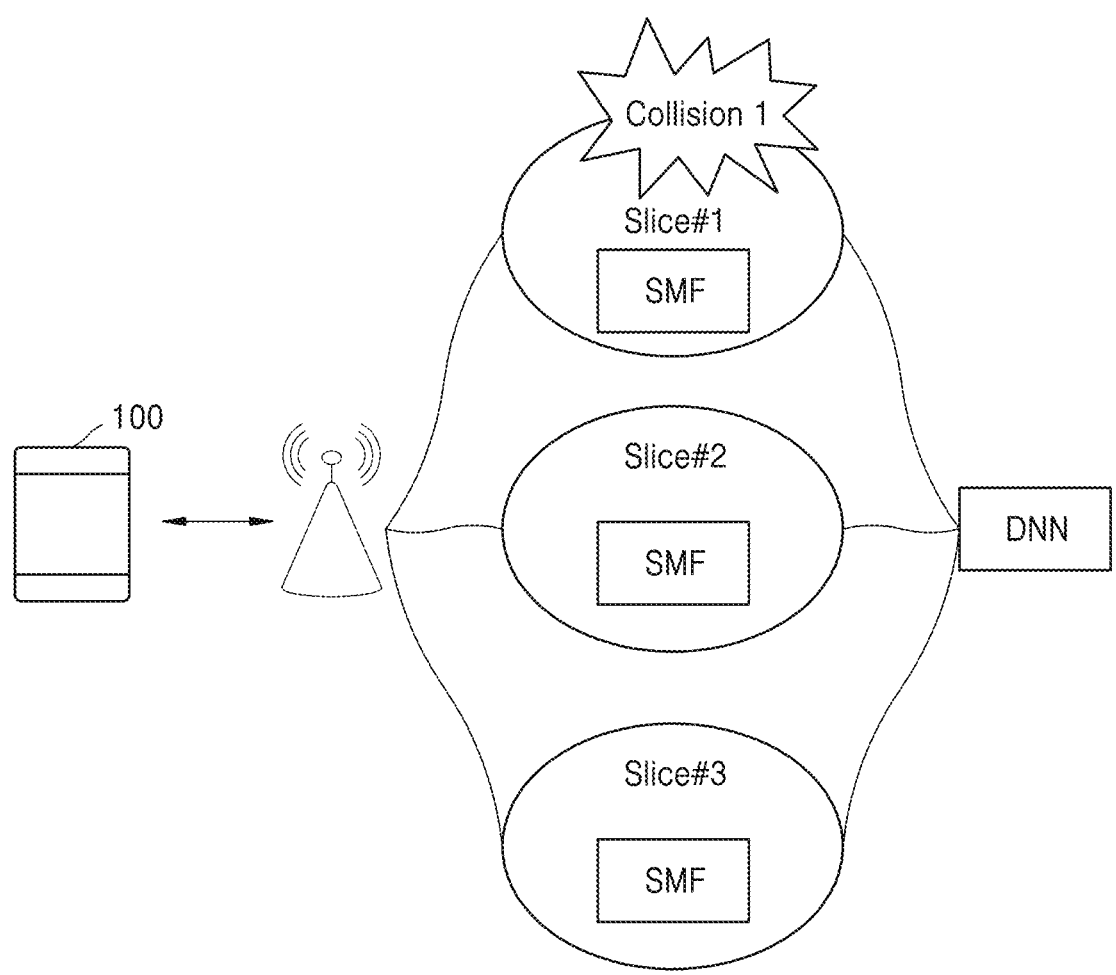
FIG. 1a is a schematic diagram illustrating a method of detecting a congestion in a specific slice of a wireless communication system, according to a prior art.

Accordingly the embodiments herein provide a wireless communication system for managing network slice congestion. The wireless communication system includes a User Equipment (UE), operably coupled to a core network. The UE is configured to transmit a first NAS signaling message to the core network, wherein the first NAS signaling message comprises a specific network slice identity. The core network is configured to detect the network slice congestion in the wireless communication system. Further, the core network is configured to indicate the network slice congestion using a second NAS signaling message to the User Equipment (UE), wherein the second NAS signaling message comprising a reject cause value and a back off timer for the requested network slice identity.

In an embodiment, further the UE is configured to receive the second NAS signaling message comprising the reject cause value and the back off timer for the requested network slice identity, in response to detecting the network slice congestion. Further, the UE is configured to perform a retransmission of first NAS signaling message, once the back off timer is expired.

In an embodiment, the network slice congestion is detected on one of the specific network slice in the wireless communication system OR, on a network slice and a Data Network Name (DNN) combination of the wireless communication system.

In an embodiment, the UE is configured to avoid retransmission of the first NAS signaling message for the specific network slice identity until an expiry of the back off timer.

In an embodiment, the UE is configured to avoid retransmission of the first NAS signaling message for the specific network slice identity and the DNN combination until an expiry of the back off timer.

Accordingly the embodiments herein provide a wireless communication system for managing network slice congestion. The wireless communication system includes a User Equipment (UE), operably coupled to a core network. The UE is configured to transmit a service request to the core network through a first NAS signaling message, wherein the service request comprises Protocol Data Unit (PDU) session ID. The core network is configured to receive a service request from the UE through the first NAS signaling message, wherein the service request comprises a Protocol Data Unit (PDU) session IDs. Further, the core network is configured to determine a data path congestion on the PDU session IDs. Further, the core network is configured to indicate the data path congestion to the UE using the second NAS signaling message, wherein the second NAS signaling message comprises a reject cause value and a back off timer for the data plane congestion on the PDU session IDs.

In an embodiment, the UE is configured to receive the second NAS signaling message from the core network, wherein the second NAS signaling message comprises a reject cause value and the back off timer for the data plane congestion on the PDU session ID, in response to detecting the network slice congestion. Further, the UE is configured to store the back off timer for the data path congestion on the PDU session ID. Further, the UE is configured to avoid transmitting the service request for user plane resources of the PDU session ID, to the core network until an expiry of the back off timer associated with the PDU session ID.

Accordingly the embodiments herein provide a core network for managing network slice congestion in a wireless communication system. The core network includes a network slice congestion engine, operably coupled with a memory and a processor. The network slice congestion engine is configured to detect the network slice congestion in the wireless communication system, upon receiving a service request from the User Equipment (UE) through a first NAS signaling message comprises a specific network slide identity. Further, the network slice congestion engine is configured to indicate the network slice congestion using a second NAS signaling message to the UE, wherein the second NAS signaling message comprising a reject cause value and a back off timer for the requested network slice identity.

Accordingly the embodiments herein provide a UE for managing a network slice congestion in a wireless communication system. The UE includes a network slice congestion engine, operably coupled with a memory and a processor. The network slice congestion engine is configured to transmit a first NAS signaling message to the core network, wherein the first NAS signaling message comprises a specific network slide identity. Further, the network slice congestion engine is configured to receive a second NAS signaling message from the core network, wherein the second NAS signaling message comprising the reject cause value and the back off timer for the requested network slice identity, upon detecting the network slice congestion. Further, the network slice congestion engine is configured to perform a retransmission of the service request through the first NAS signaling message, once the back off timer expired.

In an embodiment, the network slice congestion engine is further configured to avoid retransmission of the first NAS signaling message for the specific network slice identity until an expiry of the back off timer.

In an embodiment, the network slice congestion engine is further configured to avoid retransmission of the first NAS signaling message for the combination of specific network slice identity and the DNN until an expiry of the back off timer.

Accordingly the embodiments herein provide a core network for managing a network slice congestion in a wireless communication system. The core network includes a network slice congestion engine, operably coupled with a memory and a processor. The network slice congestion engine is configured to receive a service request from a User Equipment (UE) through a first NAS signaling message, wherein the service request comprises Protocol Data Unit (PDU) session IDs. Further, the network slice congestion engine is configured to determine a data path congestion on the PDU session IDs. Furthermore, the network slice congestion engine is configured to indicate the data path congestion to the UE using the second NAS signaling message, wherein the second NAS signaling message comprises a reject cause value and a back off timer for the data plane congestion on the PDU session IDs.

Accordingly the embodiments herein provide a UE for managing a network slice congestion in a wireless communication system. The UE includes a network slice congestion engine, operably coupled with a memory and a processor. The network slice congestion engine is configured to transmit a service request to the core network through a first NAS signaling message, wherein the service request comprises Protocol Data Unit (PDU) session IDs. Further, the network slice congestion engine is configured to receive the second NAS signaling message from the core network, wherein the second NAS signaling message comprises the reject cause value and the back off timer for the data plane congestion on the PDU session ID, in response to detecting the network slice congestion. Further, the network slice congestion engine is configured to store the back off timer for the data path congestion on the PDU session ID. Furthermore, the network slice congestion engine is configured to avoid transmitting the service request for the user plane resources of the PDU session ID to the core network until an expiry of the back off timer associated with the PDU session ID.

Accordingly the embodiments herein provide a method for managing a network slice congestion in a wireless communication system by a core network. The method includes detecting, by the core network, the network slice congestion in the wireless communication system, upon receiving a service request from the User Equipment (UE) through a first NAS signaling message comprises a specific network slide identity. Further, the method includes indicating, by the core network, the network slice congestion using a second NAS signaling message to the UE, wherein the second NAS signaling message comprising a reject cause value and a back off timer for the specific network slice identity.

In an embodiment, wherein the network slice congestion is detected on one of the specific network slice in the wireless communication system or, on a combination of network slice and a Data Network Name (DNN) of the wireless communication system.

Accordingly the embodiments herein provide a method for managing a network slice congestion in a wireless communication system a User Equipment (UE). The method includes transmitting, by the UE, a first NAS signaling message to a core network, wherein the first NAS signaling message comprises a specific network slide identity. Further, the method includes receiving, by the UE, a second NAS signaling message from the core network, wherein the second NAS signaling message comprising a reject cause value and a back off timer for the specific network slice identity, upon detecting the network slice congestion. Furthermore, the method includes performing, by the UE, a retransmission of the service request through the first NAS signaling message, once the back off timer expired.

Accordingly the embodiments herein provide a method for managing a network slice congestion in a wireless communication system by a core network. The method includes receiving, by the core network, a service request from a User Equipment (UE) through a first NAS signaling message, wherein the service request comprises Protocol Data Unit (PDU) session IDs. Further, the method includes determining, by the core network, a data path congestion on the PDU session IDs. Furthermore, the method includes indicating, by the core network, the data path congestion to the UE using a second NAS signaling message, wherein the second NAS signaling message comprises a reject cause value and a back off timer for the data plane congestion on the PDU session IDs.

Accordingly the embodiments herein provide a method for managing a network slice congestion in a wireless communication system a User Equipment (UE). The method includes transmitting, by the UE, a service request to the core network through a first NAS signaling message, wherein the service request comprises Protocol Data Unit (PDU) session IDs. Further, the method includes receiving, by the UE, a second NAS signaling message from the core network, wherein the second NAS signaling message comprises a reject cause value and a back off timer for the data plane congestion on the PDU session ID, in response to detecting the network slice congestion. Further, the method includes storing, by the UE, the back off timer for the data path congestion on the PDU session ID. Furthermore, the method includes transmitting, by the UE, the service request for user plane resources of the PDU session ID, to the core network after an expiry of the back off timer associated with the PDU session ID.

Accordingly the embodiments herein provide a method for maintaining a service continuity by a User Equipment (UE) in a wireless communication system. The method includes detecting, by the UE, a change in location during a mobility of the UE from a first registration or tracking area to another registration or tracking area within a first Radio Access Technology, wherein the UE is registered in core networks of two different radio access technology (Dual Registration). Further, the method includes triggering, by the UE, a tracking area update or a mobility registration procedure in the first Radio Access Technology, in response to receiving a registration reject or tracking area update reject from the core network on the first radio access technology. Furthermore, the method includes initiating, by the UE, an attach request or registration request procedure by transmitting an attach request or initial registration request message in response to receiving the receiving the registration reject or tracking area update reject, wherein the initial attach request or initial registration request message comprising a registration status of the UE of a second Radio access technology to a core network of the first Radio Access Technology (RAT).

In an embodiment, the first radio access technology and second radio access technology include at least one of a 3rd Generation Partnership Project (3GPP) Long Term Evolution (LTE) RAT and a 3GPP New Radio (NR) RAT.

In an embodiment, the registered status of the second Radio Access Technology (RAT) comprises of the UE status IE which indicates if UE is registered with 4G network (with indication of UE is in EMM-REGISTERED state) or not registered with 4G network (with indication of UE is not in EMM-REGISTERED state) when the UE is registering with AMF. If the UE registering with MME the other registered RAT registration status comprises of the UE status IE which indicates if UE is registered with 5G network (with indication of UE is in 5GMM-REGISTERED state) or not registered with 5G network (with indication of UE is not in 5GMM-REGISTERED state).

In an embodiment, the service continuity to the UE is maintained by retaining the other registered RAT information of the UE at the Core Network associated with the second radio access technology.

Accordingly the embodiments herein provide a method for handling dual registration of a User Equipment (UE) in a wireless communication system. The method includes determining that the UE supports dual registration on different RATs when Nx (N26) interface is available between AMF and MME. Further, the method includes receiving a registration accept message from an Access and Mobility Management Function (AMF) entity, wherein the registration accept message indicates the UE to support a single registration. Furthermore, the method includes operating the UE in the dual registration even though registration accept message indicates the UE to operate in the single registration mode.

Accordingly the embodiments herein provide a UE for maintaining a service continuity in a wireless communication system. The UE includes a service continuity controller operably coupled with a memory and a processor. The service continuity controller is configured to detect a change in location during a mobility of the UE from a first registration or tracking area to another registration or tracking area within a first Radio Access Technology, wherein the UE is registered in core networks of two different radio access technology (Dual Registration). The service continuity controller is configured to trigger a tracking area update or a mobility registration procedure in the first Radio Access Technology, in response to receiving a registration reject or tracking area update reject from the core network on the first radio access technology. Further, the service continuity controller is configured to initiate an attach request or registration request procedure by transmitting an attach request or initial registration request message in response to receiving the receiving the registration reject or tracking area update reject, wherein the initial attach request or initial registration request message comprising a registration status of the UE of a second Radio access technology to a core network of the first Radio Access Technology (RAT).

In an embodiment, the registration status of the UE of the second Radio access technology comprises: Evolved Packet System (EPS) Mobility Management (EMM) registration status set to one of: the UE is not in EMM-REGISTERED state and the UE is in EMM-REGISTERED state, when registering to the Access and Mobility Management Function (AMF), or 5GMM registration status set to one of: the UE is not in 5GMM-REGISTERED state and UE is in 5GMM-REGISTERED state, when registering to the Mobility Management Function (MME).

Accordingly the embodiments herein provide a UE for handling dual registration in a wireless communication system. The UE includes a registration engine operably coupled with a memory and a processor. The registration engine is configured to determine that the UE supports dual registration on different RATs when Nx (N26) interface is available. Further, the registration engine is configured to receive a registration accept message from an Access and Mobility Management Function (AMF) entity, wherein the registration accept message indicates the UE to operate in a single registration mode. Furthermore, the registration engine is configured to operate the UE in the dual registration mode even though registration accept message indicates the UE to operate in the single registration mode.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

MODE FOR INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, storage circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Wireless communication systems are widely deployed to provide various types of communication content such as voice, video, packet data, messaging, broadcast, or the like. In order to achieve a high data transmission rate, 5G communication system is considered to be implemented in a millimeter wave (mm Wave) or extremely higher frequency bands as well, for e.g., 28 GHz, 60 GHz, etc., so as to accomplish higher data rates. In conventional systems, different services use a corresponding number of dedicated communication networks, each tailored to the respective service to be implemented. Instead of using a plurality of specifically designed networks, another approach, known as network slicing, may use a single network architecture, allows multiple virtual networks to be created on top of a common shared physical infrastructure. In the case of 5G, a single physical network will be sliced into multiple virtual networks that can support different radio access networks (RANs), or different service types running across a single RAN.

Figure 1B:
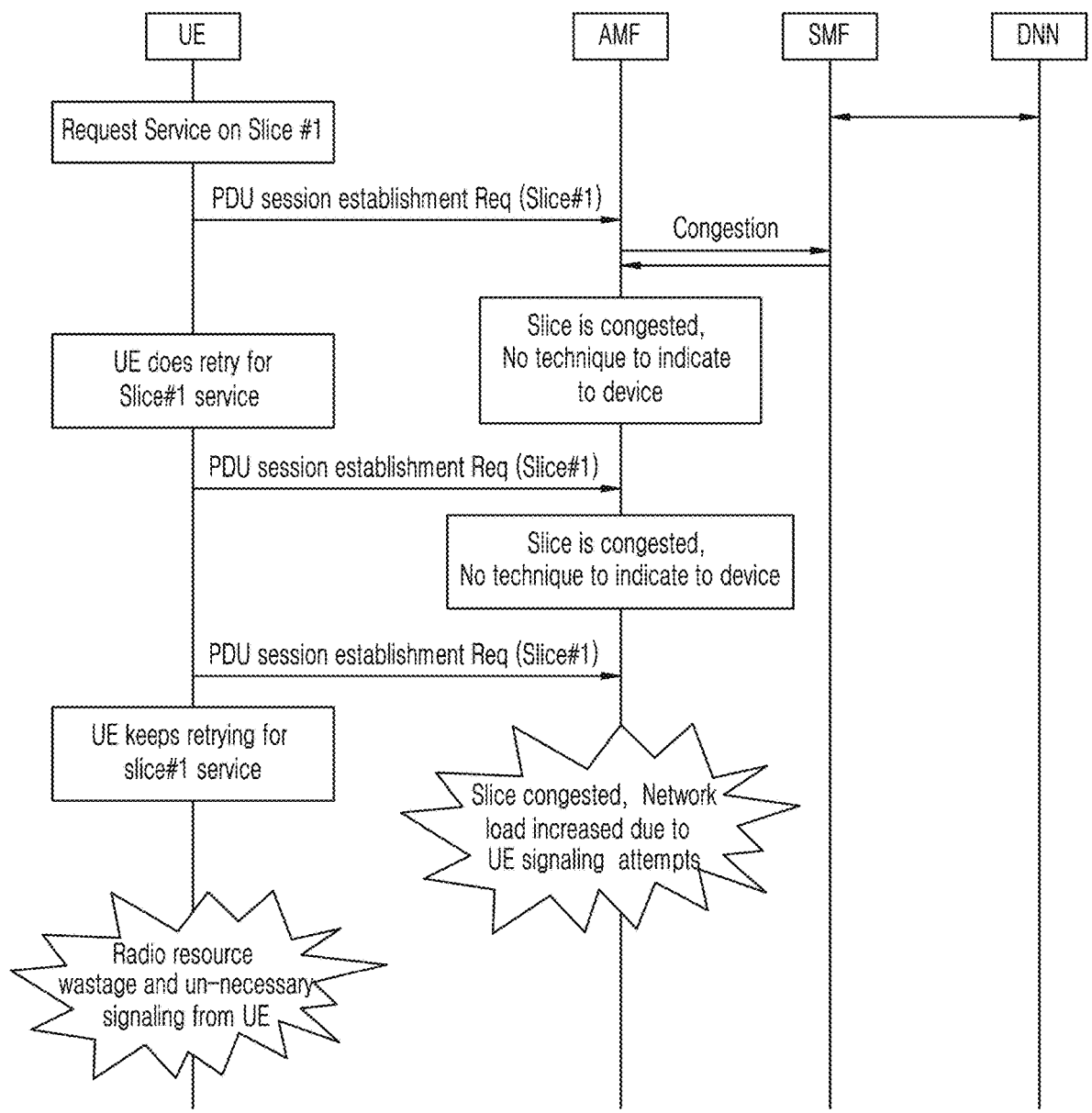
FIG. 1B is a sequence diagram illustrating the method of detecting the congestion in the specific slice of the wireless communication system, according to a prior art.

FIG. 1a is a schematic diagram illustrating a method of detecting a congestion in a specific slice of a wireless communication system, according to a prior art. In the 5G system, a User Equipment (UE) can connect to a same Data Network Name (DNN) using multiple slices. The slice has its own network resources to provide a specific service to the UE. As shown in the FIG. 1a, there is possibility that the DNN is not congested but only a particular network slice is overloaded. FIG. 1B is a sequence diagram illustrating a method of detecting a slice congestion in the wireless communication system, according to a prior art. However, as shown in the FIG. 1B, there is no method for defining the network slice congestion, and there is no possibility for the network to indicate the UE about the network slice congestion. Hence, the UE keeps retransmitting a service request for the specific slice. This result in a radio resource wastage and un-necessary signaling from the UE can cause increase in power consumption.

Figure 2A:
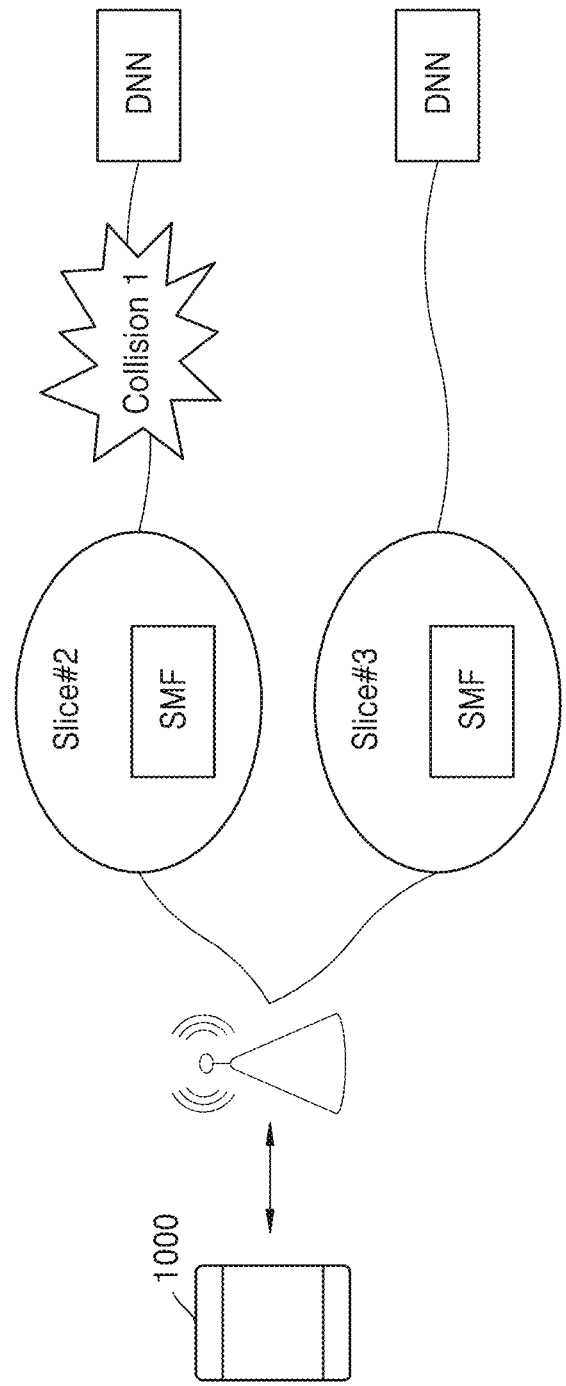
FIG. 2a is a schematic diagram illustrating a method of detecting a network slice congestion between a slice and a DNN, according to a prior art.
Figure 2B:
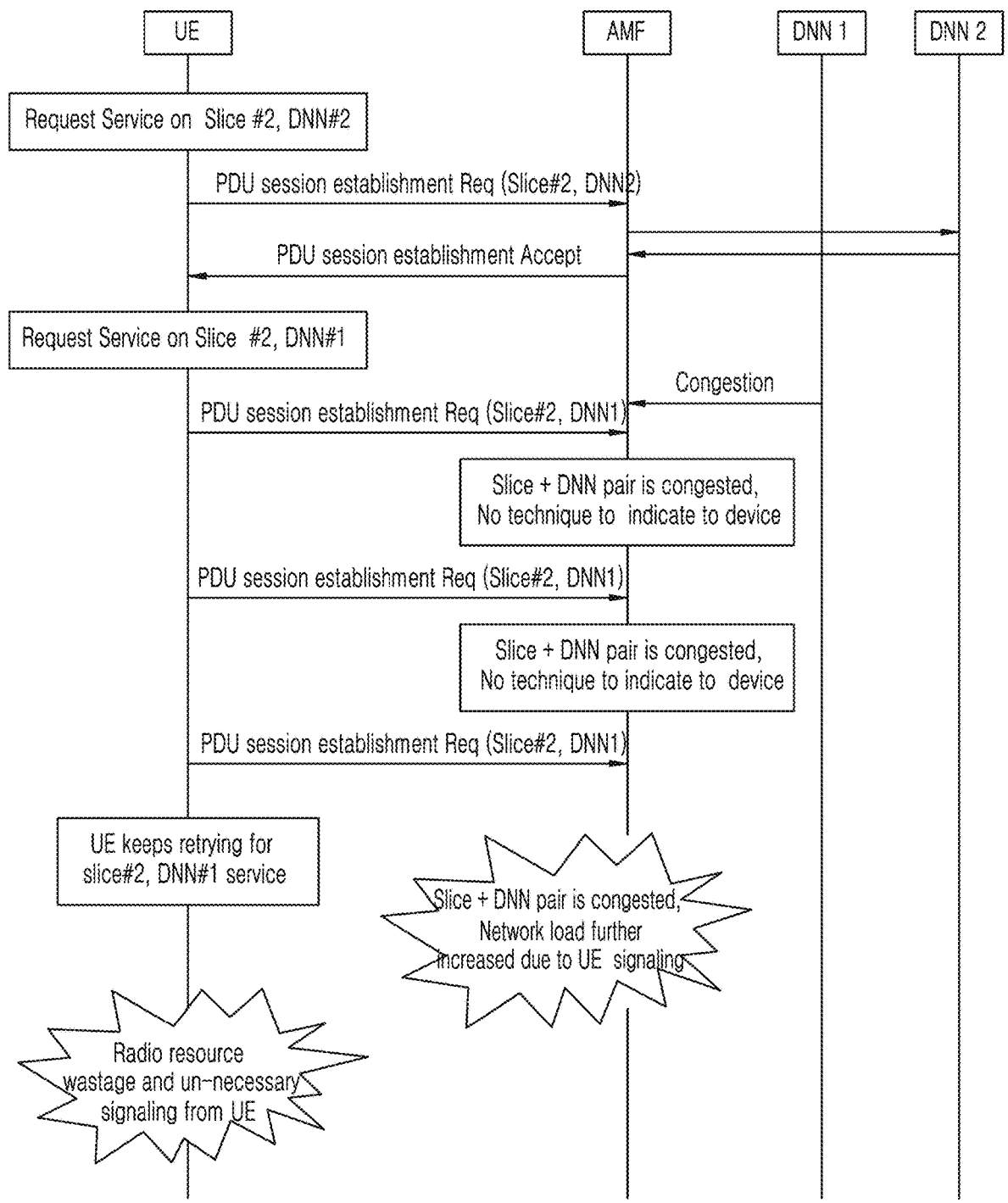
FIG. 2b is a sequence diagram illustrating the method of detecting the network slice congestion between the slice and the DNN, according to a prior art.

FIG. 2a is a schematic diagram illustrating a method of detecting a network slice congestion between a slice and a DNN, according to a prior art. The UE can connect to different DNNs using same slice ID. Further, there is possibility that only one particular DNN and slice pair is congested which can happen if there are too many Protocol Data Units (PDUs) on the network side using same DNN and slice. FIG. 2b is a sequence diagram illustrating a method of detecting a network slice congestion between a slice and a DNN, according to a prior art. For example, as shown in the FIG. 2b, DNN1+slice2 is congested and DNN2+slice2 are not. However, there is no method to indicate that a particular "DNN+Slice" pair is congested to the UE.

Figure 3A:
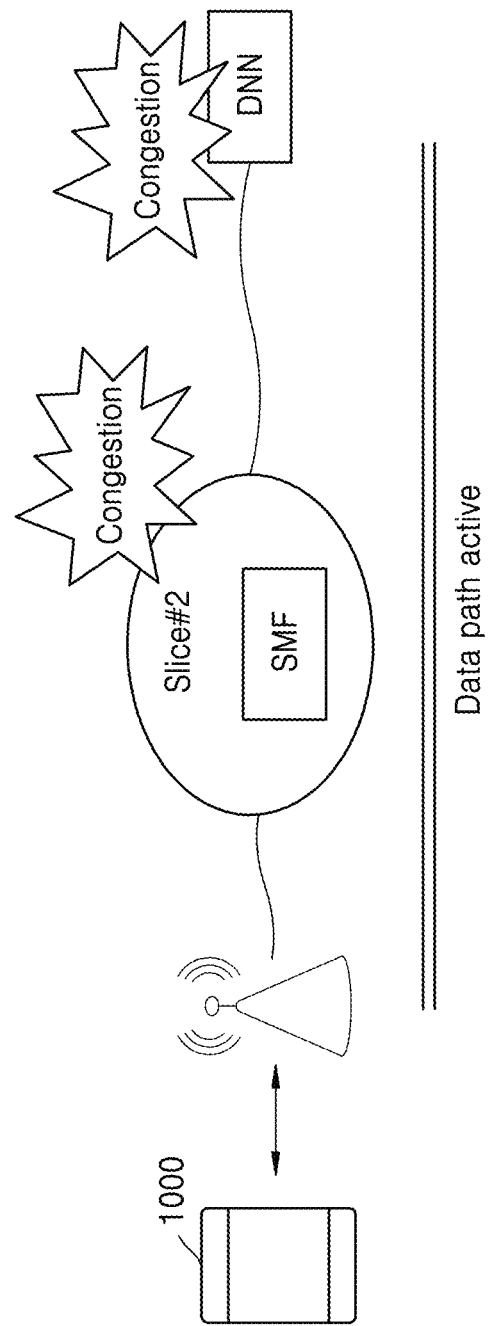
FIG. 3a is a schematic diagram illustrating a method of detecting a data path congestion between the slice and the DNN, according to a prior art.
Figure 3B:
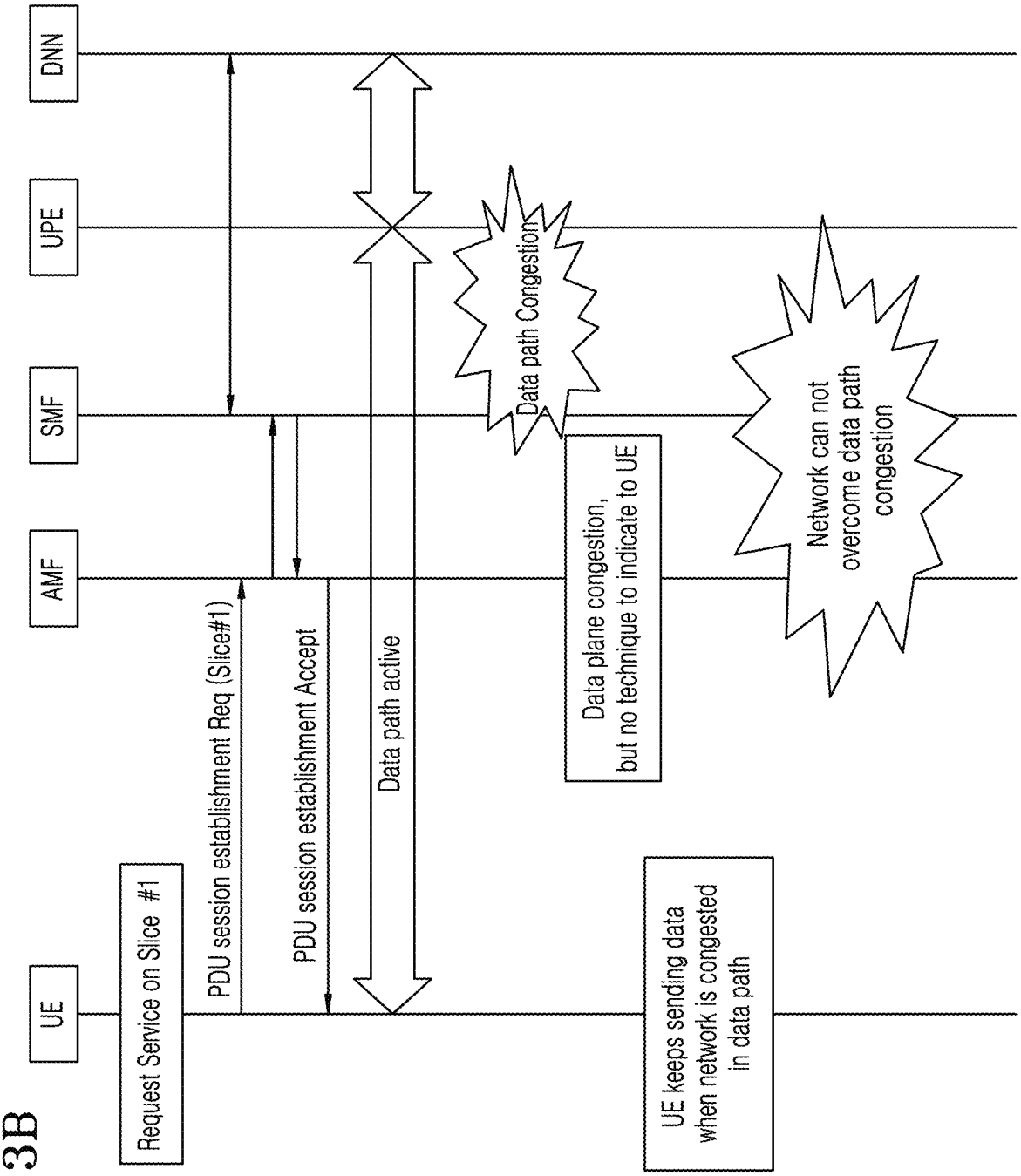
FIG. 3b is a sequence diagram illustrating a method of detecting the data path congestion between the slice and the DNN, according to a prior art.

FIG. 3a is a schematic diagram illustrating a method of detecting a data path congestion between the slice and the DNN, according to a prior art. FIG. 3b is a sequence diagram illustrating a method of detecting a data path congestion between the slice and the DNN, according to a prior art. For example, as shown in the FIG. 3b, data path is congested. However, there is no method in which the network can indicate the UE that the data path is congested. Hence, the UE keeps retransmitting the PDUs, even the data path is congested in the network.

Further, the wireless communication systems are widely deployed to provide various types of communication content such as voice, video, packet data, messaging, broadcast, or the like. In the wireless communication system, for a dual-mode or a multi-mode registration, a User Equipment (UE) includes dual or multiple radio transceivers, each configured to communicate on a particular radio access technology (RAT), such as $3^{rd}$ Generation Partnership Project (3GPP) access systems such as 4G system and 5G system and non-3GPP access systems. However, in current systems, UE can maintain some PDN's in 4G RAT and some PDU's in 5G RAT. Further, during location change of the UE during mobility from one tracking area to another tracking area in active RAT (4G or 5G), UE initiates tracking area update or registration request procedure. In such scenario, if UE receives the temporary network reject from the network, Initial Attach Request or Initial Registration request is initiated by the UE in active RAT, which triggers core network of the active RAT to initiate location update to the HSS/UDM. Due to this location update procedure to HSS/UDM, PDU's active for UE on alternate RAT's are deactivated causing data loss for the UE.

Figure 11A:
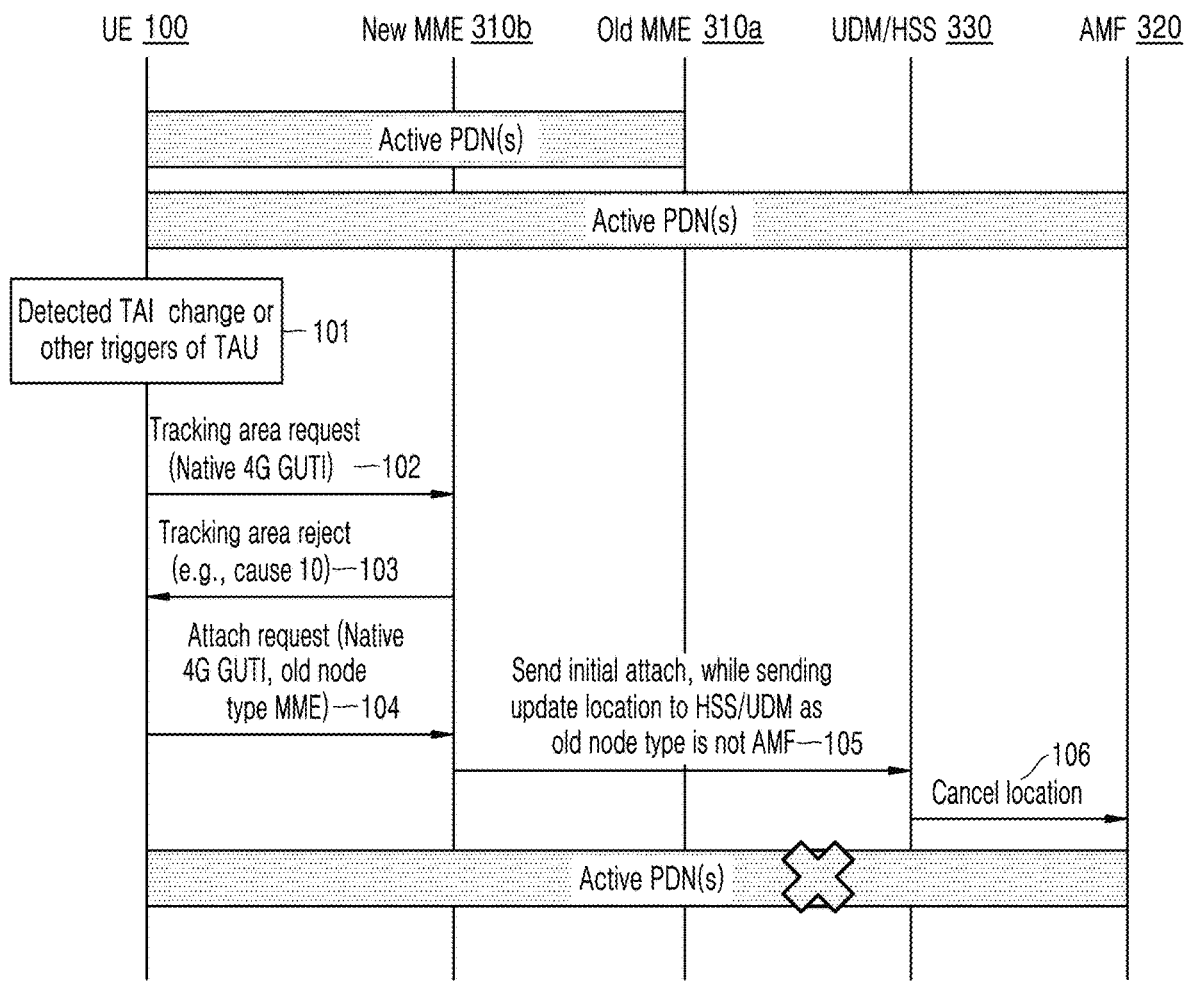
FIG. 11a is a sequence diagram illustrating a method of receiving a registration failure message (e.g., temporary rejection) from the MME during registration, according to a prior art.

FIG. 11a is a sequence diagram illustrating a method of receiving a registration failure message (e.g., temporary rejection) from the MME during registration, according to a prior art. As shown in the FIG. 1a, consider another scenario that the UE 100 is registered in the dual-mode registration, in which the UE 100 can access the 3GPP access network (such as 4G) using an old MME 310a. If the UE 100 moves to a new tracking area within a 4G coverage area then, the UE 100 detects changes in the tracking area at UE at step 101. Further, at step 102, the UE 100 can send a Tracking Area update (TAU) attach request with a new MME 310b. However, the new MME 310b can send a tracking area reject/implicit detach to the UE 100 at step 103. As the 4G identity is still valid, the UE 100 may send an attach request with a native 4G GUTI details to the new MME 310b at step 104. As the UE 100 does not includes that the old MME 310a as the AMF 320 in the attach request, the new MME 310b may send the update location to Home Subscriber Server/User Data Model (HSS/UDM) 330 with an initial attach flag set at step 105. Further, the HSS/UDM 330 can delete the entire context from the UE 100 by sending cancel location to the AMF 320, even the PDU in the 5G RAT network remains active at step 106. This results in a loss of connection due to switching from one tracking area to another tracking area.

Currently, dual registration is given by the network in the 5G in registration accept if the N26 interface is not supported by the network. However, there can be some devices which support dual radio which may want to use the dual registration to support different PDU on different RAT. Current Standard doesn't provide the provision for the UE 100 to take the decision whether it wants to support the dual registration over single registration even if N26 interface is there.

Figure 11B:
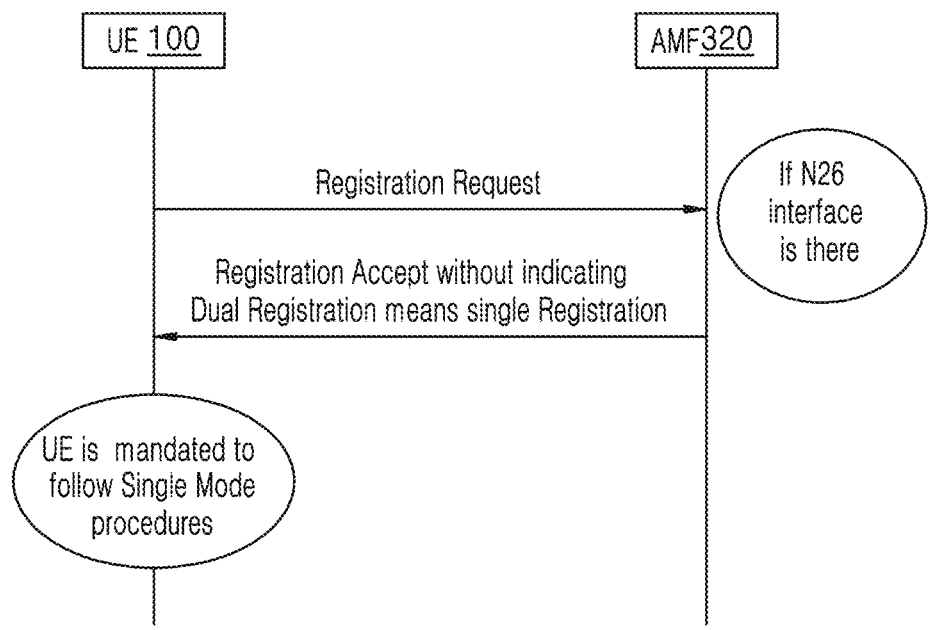
FIG. 11b is a scenario of registration accept without indicating dual registration, according to prior art.

As shown in the FIG. 11b, the UE 100 sends the registration request to the AMF 320. If N26 interface is there and the AMF 320 sends the registration accept without indicating dual registration to the UE 100 and the UE 100 is mandated to follow single mode procedures.

Thus, it is desired to address the above mentioned disadvantages or other shortcomings or at least provide a useful alternative.

Accordingly the embodiments herein provide a wireless communication system for managing a network slice congestion. The wireless communication system includes a User Equipment (UE), operably coupled to a core network. The UE is configured to transmit a first NAS signaling message to the core network, wherein the first NAS signaling message comprises a specific network slide identity. The core network is configured to detect the network slice congestion in the wireless communication system. Further, the core network is configured to indicate the network slice congestion using a second NAS signaling message to the User Equipment (UE), wherein the second NAS signaling message comprising a reject cause value and a back off timer for the requested network slice identity.

Unlike conventional methods and systems, the proposed method can be used to indicate the UE, that one of a specific slice is congested; the specific slice and the DNN combination are congested. Further, the UE stops transmitting signaling message to the core network for a back off timer. This results in saving radio resources and does not overload the core network. Hence, this results in power saving of the UE.

The proposed method can be used to indicate that the data path is congested between the specific slice and the DNN to the UE. Hence, this avoids unnecessary signaling to the core network for data bearer setup and thus saves power at the UE.

Embodiments herein provide a method for maintaining a service continuity by a User Equipment (UE) in a wireless communication system. The method includes detecting, by the UE, a change in location during mobility of the UE from a first radio access technology to a second radio access technology. Further, the method includes initiating, by the UE, an attach request procedure in response to receiving the receiving the registration reject or tracking area update reject, wherein the UE sends an attach request message includes other registered RAT information to a Mobility Management Entity (MME) associated with the second radio access technology.

Unlike conventional methods and systems, the proposed method can be used to avoid data loss in a dual registration mode of the UE. The proposed method allows the UE to send an attach request, where the attach request includes that the UE is registered on a RAT (e.g., 4G 3GPP) and an alternate RAT (e.g., 5G non-3GPP). Thus the proposed method prevents cancellation of the context information of the alternate RAT, when the UE switched from one tracking area to another tracking area in the given RAT.

In conventional methods, the UE sends the registration request to an AMF. If N26 interface is there and the AMF sends the registration accept without indicating dual registration to the UE and the UE is mandated to follow single mode procedures.

Unlike to conventional method, the proposed method can be used to allow the UE to obviate mandated the use of single registration when the dual registration is not indicated to the UE. Further, the dual registration can be used with the dual radio case even when the single registration is supported by the network.

Referring now to the drawings, and more particularly to FIG. 4 to FIG. 7, FIG. 8b, FIG. 9b, FIG. 10b, FIG. 12 to FIG. 15, FIG. 16b to FIG. 17, FIG. 18b, FIG. 19, and FIG. 20 there are shown preferred embodiments.

Figure 4:
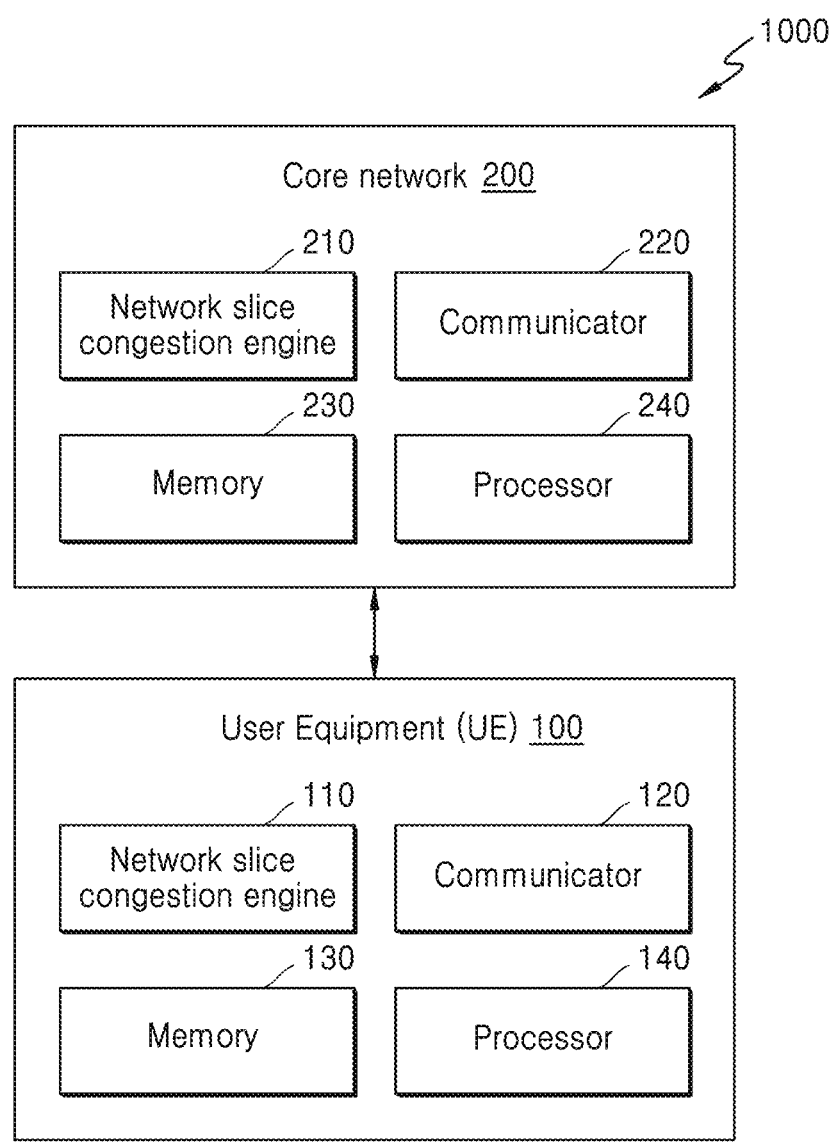
FIG. 4 is a block diagram of the wireless communication system in which a UE communicates with a core network for managing the network slice congestion, according to an embodiment as disclosed herein.

FIG. 4 is a block diagram of a wireless communication system 1000, according to an embodiment as disclosed herein. The wireless communication system 1000 includes a core network 200 and a UE 100. The core network 200 can be a cellular network, for example a 3GPP Long Term Evolution (LTE) network such as an evolved universal terrestrial radio access technology (E-UTRAN), 4G, 5G. In another embodiment, the network 400 may be a Wireless Local Area Network (WLAN) such as an Institute of Electrical and Electronics Engineers (IEEE) 802.11 Wi-Fi network. In an embodiment, the core network 200 includes a network slice congestion engine 210, a communicator 220, a memory 230, and a processor 240.

The UE 100 communicates with the network 200 for providing one or more data services to a user. In an example, the data service can be, for example, voice communication, text messaging, multimedia streaming, and Internet access. The UE 100 can be, for e.g., a cellular telephone, a smart phone, a personal computer (PC), a minicomputer, a desktop, a laptop, a handheld computer, Personal Digital Assistant (PDA), or the like. The UE 100 may support multiple Radio access technologies (RAT) such as, for e.g., Code-division multiple access (CDMA), General Packet Radio Service (GPRS), Evolution-Data Optimized EVDO (EvDO), Time-division multiple access (TDMA), GSM (Global System for Mobile Communications, WiMAX (Worldwide Interoperability for Microwave Access) technology, LTE, LTE Advanced and 5G communication technologies. In an embodiment, the UE 100 includes a network slice congestion engine 110, a communicator 120, a memory 130, and a processor 140. The base station is a radio access network which allows the UE 100 to connect with the core network 200.

The proposed method allows the core network 200 to indicate the slice congestion and provide a specific reject cause to the UE 100. Further, the core network 200 provides back off timer for the specific slice.

In an embodiment, the network slice congestion engine 110 transmits a first NAS signaling message to the core network 200. In an embodiment, the first NAS signaling message includes a specific network slide identity.

In an embodiment, the network slice congestion engine 210 detects the network slice congestion in the wireless communication system 1000 in response to receiving a service request from the UE 100 through the first NAS signaling message. In an embodiment, the network slice congestion engine 210 detects the network slice congestion on the specific network slice in the wireless communication system 1000. In another embodiment, the network slice congestion engine 210 detects the network slice congestion on the network slice and a Data Network Name (DNN) combination of the wireless communication system 1000.

Further, the network slice congestion engine 210 indicates the network slice congestion using a second NAS signaling message to the UE 100, wherein the second NAS signaling message includes a reject cause value and a back off timer for the requested network slice identity.

In an embodiment, the network slice congestion engine 110 receives the second NAS signaling message includes the reject cause value and the back off timer for the specific network slice identity, in response to detecting the network slice congestion. Further, the network slice congestion engine 110 performs a retransmission of the first NAS signaling message, once the back off timer is expired.

In an embodiment, the network slice congestion engine 110 avoids retransmission of the first NAS signaling message for the specific network slice identity until an expiry of the back off timer. In an embodiment, the network slice congestion engine 110 avoids retransmission of the first NAS signaling message for the specific network slice identity and the DNN combination until an expiry of the back off timer. Hence, this results in saving the network resources and power consumption at the UE 100.

The proposed method can be used to detect the congestion happens for an entire DNN, or for a particular slice or for a particular Slice and DNN pair.

In another embodiment, the DNN/Slice level congestion control is applicable only on Session Management (SM) signaling procedures. If the DNN congestion is active then the UE 100 shall not send another PDU session establishment, modification request message for the same DNN/slice. The DNN/slice-based session management congestion control is applicable to the NAS SM signaling initiated from the UE in the Control Plane. The Session Management congestion control does not prevent the UE 100 to send and receive data or initiate the service request procedures for activating User Plane connection towards the DNN(s) that are under Session Management congestion control. The network slice congestion engine 110 transmits the service request to the core network 200 through the first NAS signaling message, where the service request includes Protocol Data Unit (PDU) session ID. In an embodiment, the network slice congestion engine 210 receives the service request from the UE through the first NAS signaling message, where the service request includes a Protocol Data Unit (PDU) session IDs. Further, the network slice congestion engine 210 determines a data path congestion on the PDU session IDs in response to receiving the service request. Further, the network slice congestion engine 210 indicates the data path congestion to the UE using the second NAS signaling message, wherein the second NAS signaling message includes a reject cause value and a back off timer for the data plane congestion on the PDU session IDs.

In an embodiment, the network slice congestion engine 110 receives the second NAS signaling message from the core network 200, wherein the second NAS signaling message includes a reject cause value and the back off timer for the data plane congestion on the PDU session ID, in response to detecting the network slice congestion. Further, the network slice congestion engine 110 stores the back off timer for the data path congestion on the PDU session ID. Furthermore, the network slice congestion engine 110 transmits the service request for user plane resources of the PDU session ID, to the core network after an expiry of the back off timer associated with the PDU session ID.

In an embodiment, the communicator 120 is configured to communicate internally between hardware components in the core network 200. In an embodiment, the processor 140 is configured to process various instructions stored in the memory 130 for managing the network slice congestion in the wireless communication system.

The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In some examples, the memory 130 can be configured to store larger amounts of information than the memory. In certain examples, a non-transitory storage medium may store data that can, over time, change (e.g., in Random Access Memory (RAM) or cache).

In an embodiment, the communicator 220 is configured to communicate internally between hardware components in the UE 100. In an embodiment, the processor 240 is configured to process various instructions stored in the memory 230 for managing the network slice congestion in the wireless communication system.

The memory 230 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 230 is non-movable. In some examples, the memory 230 can be configured to store larger amounts of information than the memory. In certain examples, a non-transitory storage medium may store data that can, over time, change (e.g., in Random Access Memory (RAM) or cache).

Although the FIG. 4 shows various hardware components of the core network 200 and the UE 100 but it is to be understood that other embodiments are not limited thereon. In other embodiments, the core network 200 and the UE 100 may include less or more number of components. Further, the labels or names of the components are used only for illustrative purpose and does not limit the scope of the invention. One or more components can be combined together to perform same or substantially similar function of managing network slice congestion in the wireless communication system 1000.

Figure 5A:
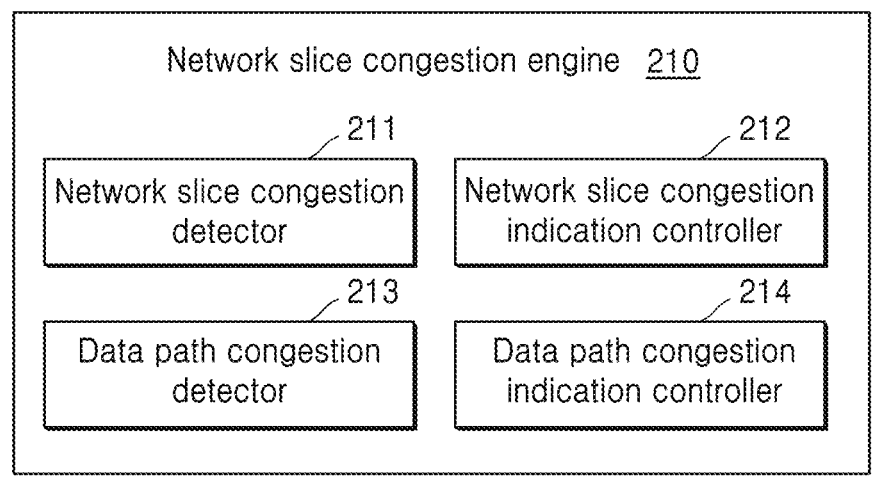
FIG. 5a is a block diagram of a network slice congestion engine of the core network for managing the network slice congestion, according to an embodiment as disclosed herein.

FIG. 5a is a block diagram of the network slice congestion engine 210 of the core network 200 for managing network slice congestion, according to an embodiment as disclosed herein. In an embodiment, the network slice congestion engine 210 includes a network slice congestion detector 211, a network slice congestion indication controller 212, a data path congestion detector 213, and a data path congestion controller 214.

In an embodiment, the network slice congestion detector 111 detects the network slice congestion in the wireless communication system 1000 in response to receiving the service request from the UE 100 through the first NAS signaling message. In an embodiment, the network slice congestion detector 211 detects the network slice congestion on the specific network slice in the wireless communication system 1000. In another embodiment, the network slice congestion detector 211 detects the network slice congestion on the network slice and a Data Network Name (DNN) combination of the wireless communication system 1000.

Further, the network slice congestion indication controller 212 indicates the network slice congestion using the second NAS signaling message to the UE 100, wherein the second NAS signaling message includes the reject cause value and the back off timer for the requested network slice identity.

In another embodiment, the data path congestion detector 113 determines the data path congestion on the PDU session IDs in response to receiving the service request. Further, the data path congestion controller 214 indicates the data path congestion to the UE 100 using the first NAS signaling message, where the first NAS signaling message includes a reject cause value and a back off timer for the data plane congestion on the PDU session IDs.

Figure 5B:
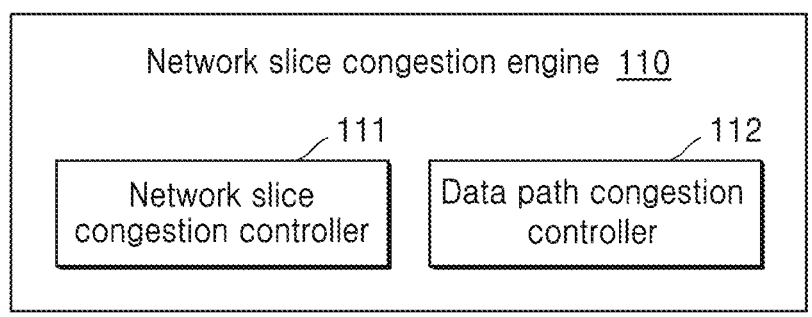
FIG. 5b is a block diagram of a network slice congestion engine of the UE for managing the network slice congestion, according to an embodiment as disclosed herein.

FIG. 5b is a block diagram of a network slice congestion engine of the UE 100 for managing network slice congestion, according to an embodiment as disclosed herein. In an embodiment, the network slice congestion engine 110 includes a network slice congestion controller 111 and a data path congestion controller 112.

In an embodiment, the network slice congestion controller 111 transmits the service request to the core network 200 through the first NAS signaling message, where the service request includes Protocol Data Unit (PDU) session ID.

In an embodiment, the network slice congestion controller 111 receives the second NAS signaling message includes the reject cause value and the back off timer for the specific network slice identity, in response to detecting the network slice congestion. Further, the data path congestion controller 112 performs a retransmission of the first NAS signaling message, once the back off timer is expired.

In an embodiment, the data path congestion controller 112 avoids retransmission of the first NAS signaling message for the specific network slice identity until an expiry of the back off timer. In an embodiment, the data path congestion controller 112 avoids retransmission of the first NAS signaling message for the specific network slice identity and the DNN combination until an expiry of the back off timer.

In another embodiment, the network slice congestion controller 111 receives the second NAS signaling message from the core network 200, wherein the second NAS signaling message includes the reject cause value and the back off timer for the data plane congestion on the PDU session ID, in response to detecting the network slice congestion. Further, the data path congestion controller 112 stores the back off timer for the data path congestion on the PDU session ID. Furthermore, the data path congestion controller 112 transmits the service request for user plane resources of the PDU session ID, to the core network 200 after an expiry of the back off timer associated with the PDU session ID.

Figure 6:
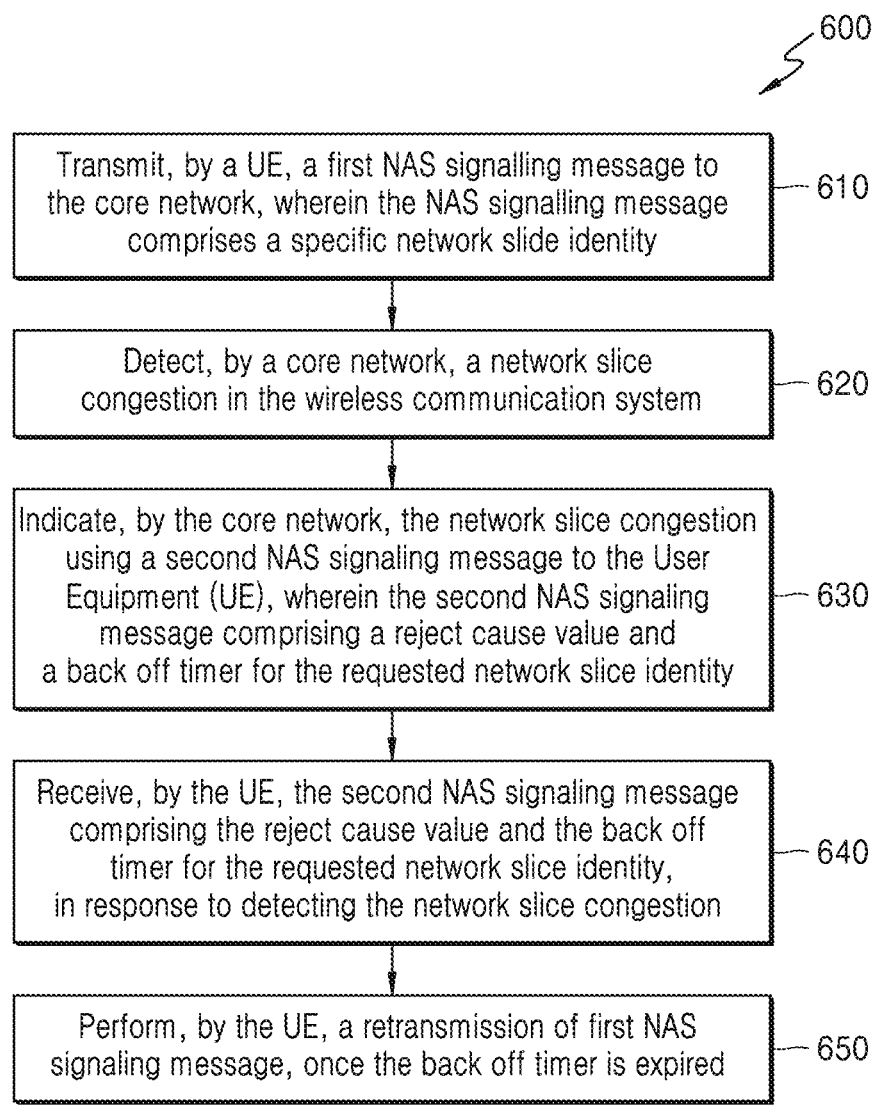
FIG. 6 is a flow diagram illustrating various operations for maintaining the network slice congestion in the wireless communication system, according to an embodiment as disclosed herein.

FIG. 6 is a flow diagram 600 illustrating various operations for maintaining the network slice congestion in the wireless communication system, according to an embodiment as disclosed herein.

At 610, the method includes transmitting, by the UE 100, the first NAS signaling message to the core network 200. In an embodiment, the method allows the network slice congestion controller 111 to transmit the first NAS signaling message to the core network 200.

At 620, the method includes detecting, by the core network 200, the network slice congestion in the wireless communication system 1000. In an embodiment, the method allows the network slice congestion detector 111 to detect the network slice congestion in the wireless communication system 1000.

At 630, the method includes indicating, by the core network 200, the network slice congestion using the second NAS signaling message to the User Equipment (UE) 100, wherein the second NAS signaling message includes the reject cause value and the back off timer for the requested network slice identity. In an embodiment, the method allows the network slice congestion indication controller 112 to indicate the network slice congestion using the second NAS signaling message to the User Equipment (UE) 100.

At 640, the method includes receiving, by the UE 100, the second NAS signaling message includes the reject cause value and the back off timer for the requested network slice identity, in response to detecting the network slice congestion. In an embodiment, the method allows the network slice congestion controller 111 to receive the second NAS signaling message includes the reject cause value and the back off timer for the requested network slice identity, in response to detecting the network slice congestion.

At 650, the method includes performing, by the UE 100, the retransmission of first NAS signaling message, once the back off timer is expired. In an embodiment, the method allows the network slice congestion controller 111 to perform the retransmission of first NAS signaling message, once the back off timer is expired.

The various actions, acts, blocks, steps, or the like in the flow diagram 600 may be performed in the order presented, in a different order or simultaneously. Further, in some embodiments, some of the actions, acts, blocks, steps, or the like may be omitted, added, modified, skipped, or the like without departing from the scope of the invention.

FIG. 7 is a flow diagram 700 illustrating various operations for maintaining a data path congestion in the wireless communication system, according to an embodiment as disclosed herein.

At 710, the method includes transmitting, by the UE 100, the service request to the core network 200 through the first NAS signaling message, wherein the service request comprises Protocol Data Unit (PDU) session ID. In an embodiment, the method allows the network slice congestion controller 111 to transmit the service request to the core network 200 through the first NAS signaling message.

At 720, the method includes receiving, by the core network 200, the service request from the UE 100 through the first NAS signaling message, wherein the service request includes the Protocol Data Unit (PDU) session IDs. In an embodiment, the method allows the network slice congestion indication controller 212 to receive the service request from the UE 100 through the first NAS signaling message.

At 730, the method includes indicating, by the core network 200, the network slice congestion using the second NAS signaling message to the User Equipment (UE) 100, wherein the second NAS signaling message includes the reject cause value and the back off timer for the requested network slice identity. In an embodiment, the method allows the network slice congestion indication controller 212 to indicate the network slice congestion using the second NAS signaling message to the User Equipment (UE) 100.

At 740, the method includes indicating, by the core network 200, the data path congestion to the UE 100 using the second NAS signaling message, where the second NAS signaling message includes the reject cause value and the back off timer for the data plane congestion on the PDU session IDs. In an embodiment, the method allows the network slice congestion indication controller 212 to indicate the data path congestion to the UE 100 using the second NAS signaling message, where the second NAS signaling message includes the reject cause value and the back off timer for the data plane congestion on the PDU session ID.

At 750, the method includes receiving, by the UE 100, the second NAS signaling message from the core network 200, wherein the second NAS signaling message comprises the reject cause value and the back off timer for the data plane congestion on the PDU session ID, in response to detecting the network slice congestion. In an embodiment, the method allows the network slice congestion controller 111 to receive the second NAS signaling message from the core network 200.

At 760, the method includes storing, by the UE 100, the back off timer for the data path congestion on the PDU session ID. In an embodiment, the method allows the data path congestion controller 112 to store the back off timer for the data path congestion on the PDU session ID.

At 770, the method includes transmitting the service request for user plane resources of the PDU session ID, to the core network 200 after an expiry of the back off timer associated with the PDU session ID. In an embodiment, the method allows the data path congestion controller 112 to transmit the service request for user plane resources of the PDU session ID, to the core network 200 after an expiry of the back off timer associated with the PDU session ID.

The various actions, acts, blocks, steps, or the like in the flow diagram 700 may be performed in the order presented, in a different order or simultaneously. Further, in some embodiments, some of the actions, acts, blocks, steps, or the like may be omitted, added, modified, skipped, or the like without departing from the scope of the invention.

Figure 8A:
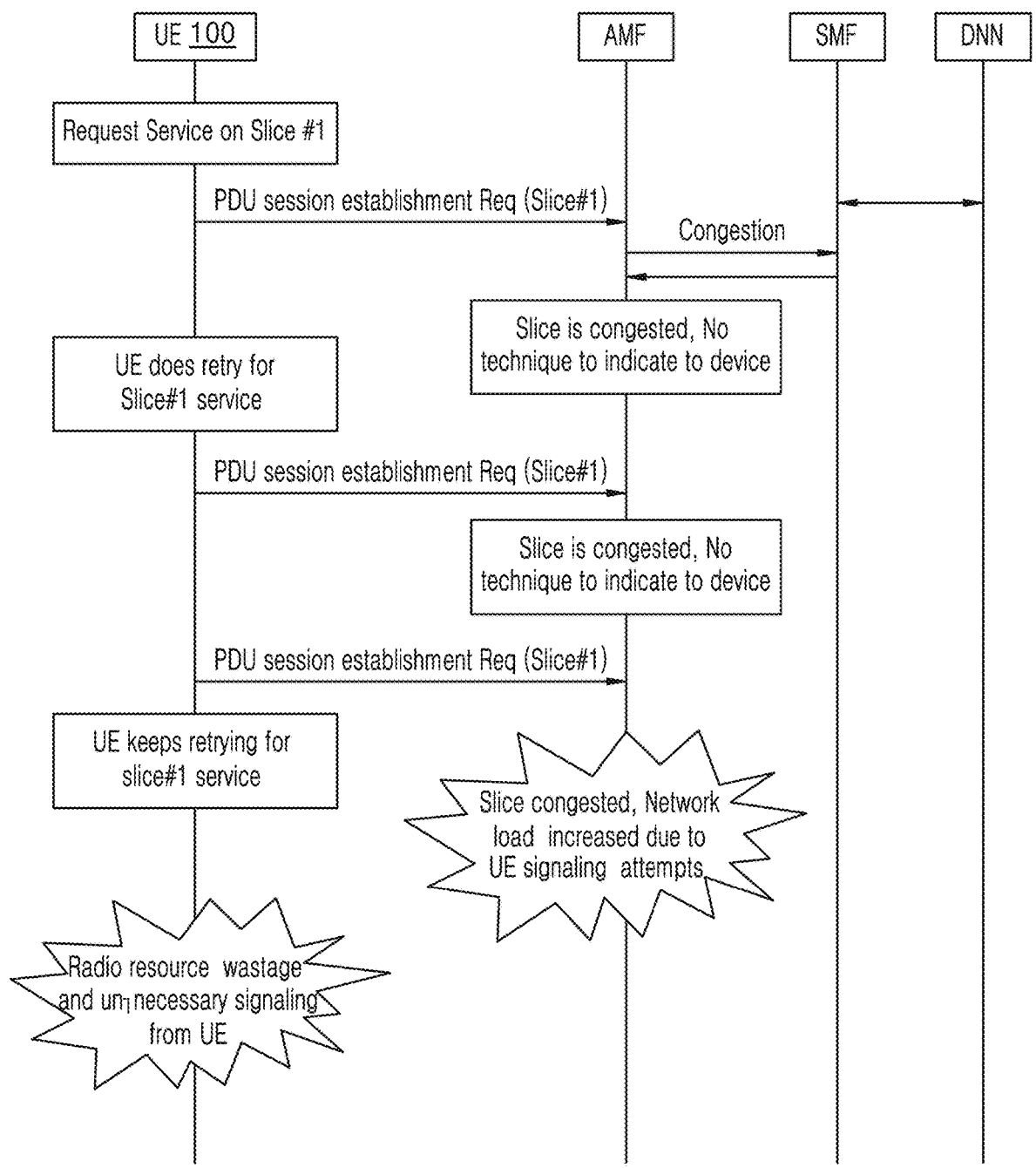
FIG. 8a is a sequence diagram illustrating a method of detecting a congestion in a specific slice of the wireless communication system, according to a prior art.
Figure 8B:
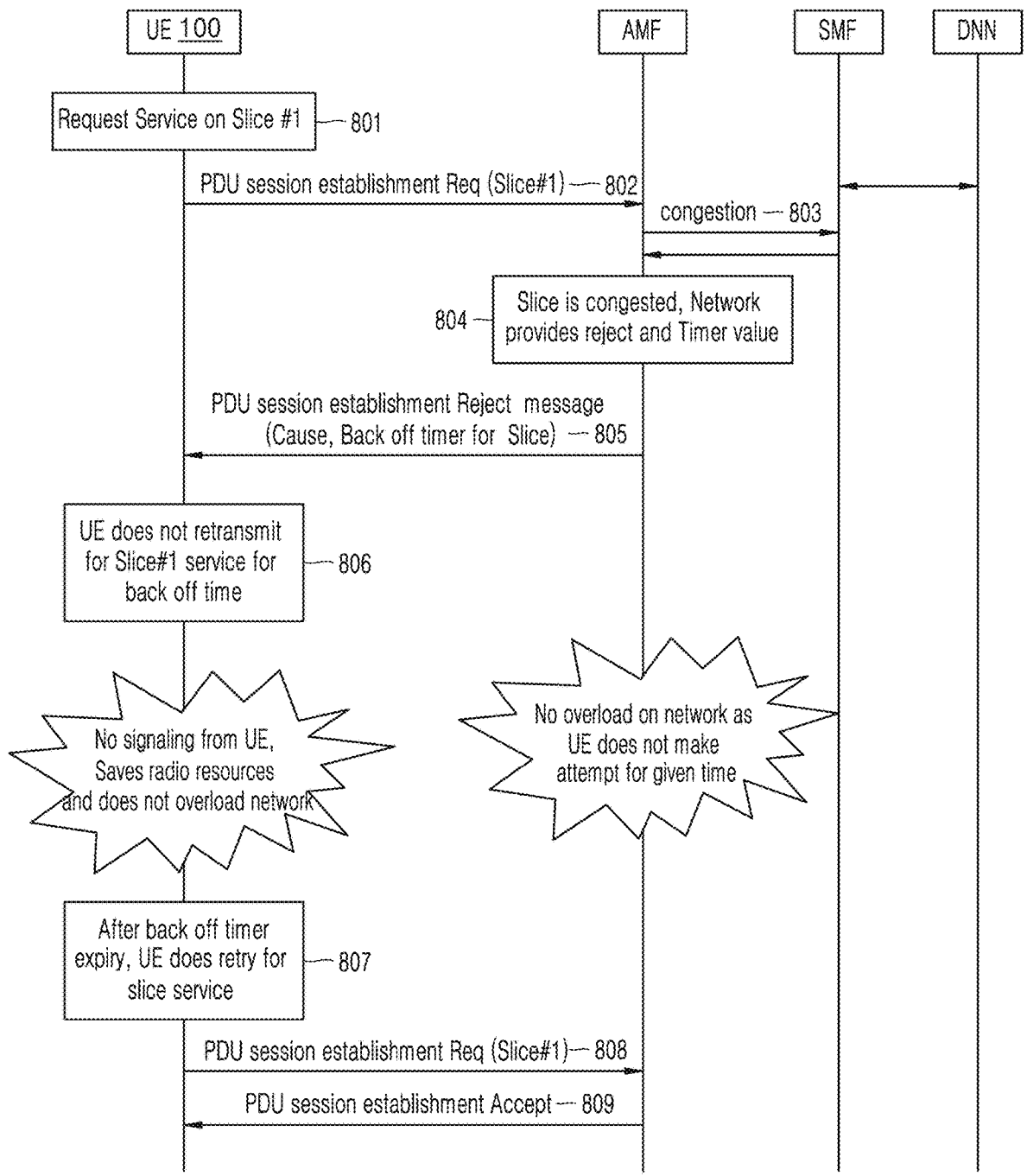
FIG. 8b is a sequence diagram illustrating a method of indicating the congestion in the specific slice to the UE, according to an embodiment as disclosed herein.

FIG. 8b is a sequence diagram illustrating a method of indicating the congestion in the specific slice to the UE, according to an embodiment as disclosed herein.

The core network 200 indicates the congestion in the specific slice to the UE 100. The core network 200 is referred as 5G Core Network (5G CN), 5G Core (5GC), NextGen CN (NG CN), NGC, and variations thereof may be used interchangeably throughout this disclosure. The core network 200 includes a Mobility Management Entity (MME), an Access Mobility Function (AMF), a Session Management Function (SMF), and a Data Network name (DNN).

The MME is configured to support an interworking procedure of the wireless communication system 1000. The MME is configured to perform the signaling and control functions to support access to the network connection of the UE 100, assignment of network resources, paging, tracking, roaming and handover or the like. The MME deals with the control plane functions related to subscriber and session management. Further, the MME manages several base stations, and performs the signaling for the selection of a conventional gateway for a handover to another 2G/3G network. The MME handles the signaling related to mobility and security for E-UTRAN access. The MME is responsible for the tracking and the paging of UE in idle-mode. The MME is the termination point of the Non-Access Stratum (NAS).

The AMF supports the following functions: termination of NAS signaling, NAS ciphering & integrity protection, registration management, Connection management, Mobility management, Access authentication and authorization, and Security context management. The SMF provides session management, it may be managed by different SMF for each session when the UE 100 having a large number of sessions.

As shown in the FIG. 8b, the UE 100 configured to transmit a service request on slice 1 at step 801. At step 802, the UE 100 transmits PDU session establishment request (Slice #1). In response to receiving the service request, the SMF determines that the Slice #1 is congested at step 803. Further, the AMF provides the reject cause and the back off timer for the Slice #1 at step 804.

At step 805, the AMF indicates the reject cause and the back off timer for the Slice #1 to the UE 100 using the PDU session establishment reject message. In response to receiving the PDU session establishment reject message from the core network 200, the UE 100 does not retransmit the service request for the Slice #1 for back off timer at step 806. There is no signaling from the UE 100 for the back off timer, which saves radio resources and does not overload the core network 200.

At step 807, after an expiry of the back off timer, the UE 100 does retransmit for Slice #1 service. At step 808, the UE 100 transmits PDU session establishment request (Slice #1).

As the congestion is resolved at the Slice #1 of the core network 200, the AMF transmits the PDU session establishment Accept at step 809.

Figure 9A:
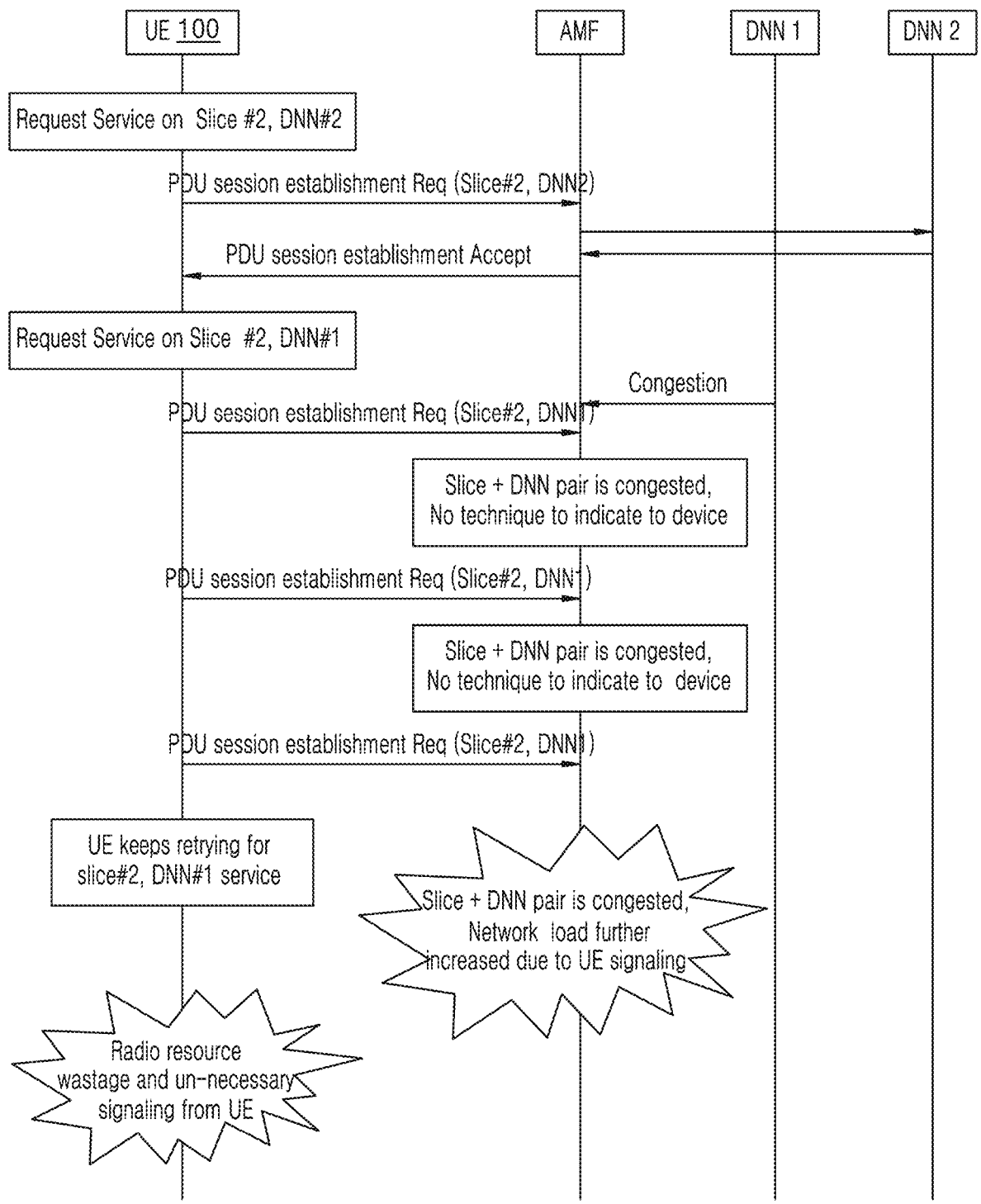
FIG. 9a is a sequence diagram illustrating a method of detecting the network slice congestion between the slice and the DNN, according to a prior art.
Figure 9B:
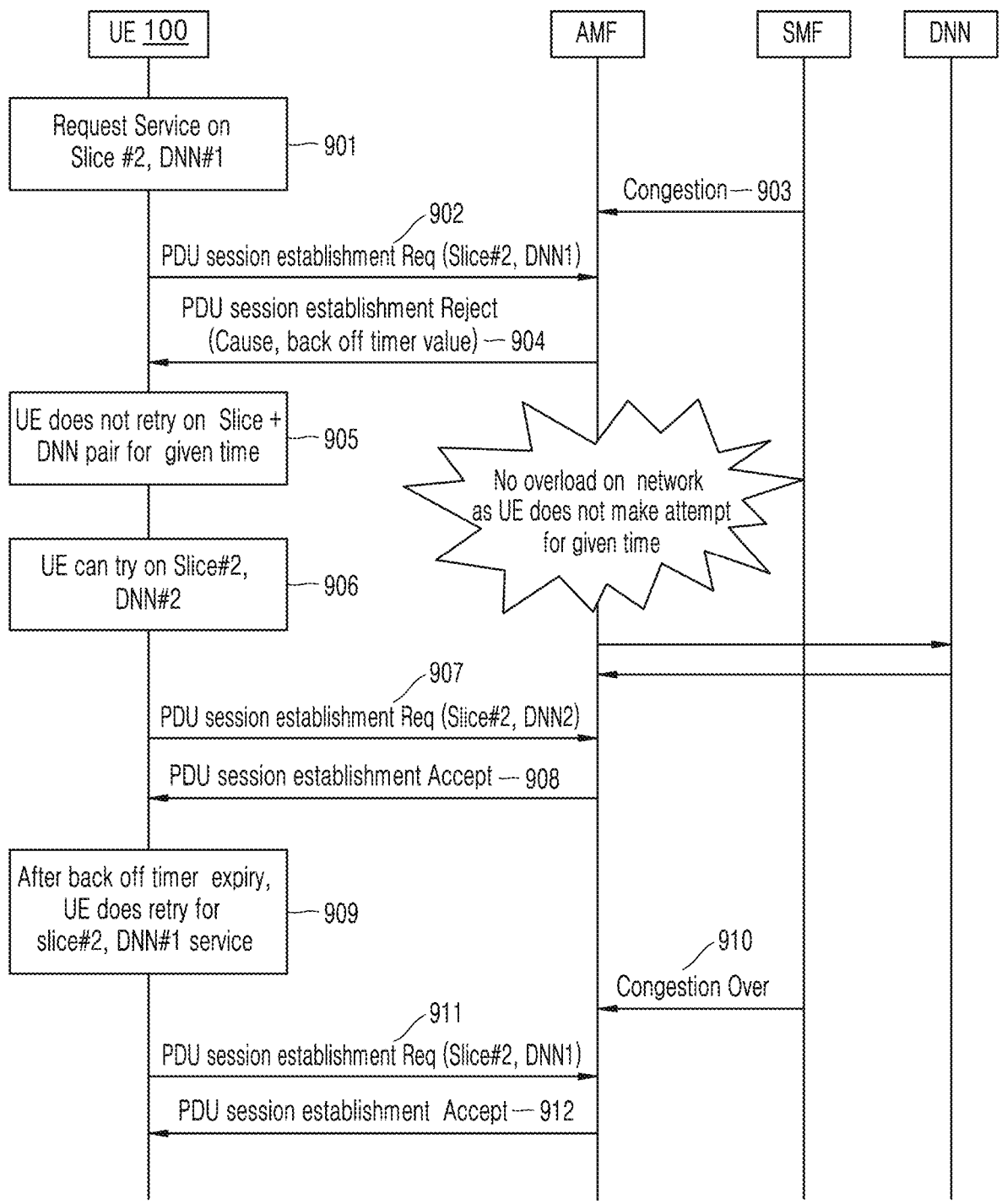
FIG. 9b is a sequence diagram illustrating a method of indicating the network slice congestion between the slice and the DNN to the UE, according to an embodiment as disclosed herein.

FIG. 9b is a sequence diagram illustrating a method of indicating the network slice congestion between the slice and the DNN to the UE 100, according to an embodiment as disclosed herein. The core network 200 indicates the congestion in the specific slice to the UE 100.

As shown in the FIG. 9b, the UE 100 configured to transmit a service request on Slice #2 and DNN #1 combination, at step 901. At step 902, the UE 100 transmits PDU session establishment request (Slice #2, DNN1). In response to receiving the service request, the DNN1 determines that there is congestion at step 903. Further, the AMF indicates the reject cause and the back off timer for the Slice #2, DNN1 to the UE 100 using the PDU session establishment reject message at step 904. In response to receiving the PDU session establishment reject message from the AMF, the UE 100 does not retransmit the service request for the Slice #2 and DNN1 combination for back off timer at step 905. There is no signaling from the UE 100 for the back off timer, which saves radio resources and does not overload the core network 200. In the meantime, the UE 100 can try for service on Slice #2, DNN #2 combinations at step 906. At step 907, the UE 100 transmits PDU session establishment request (Slice #2, DNN2) to the core network 200. In response to receiving the service request, the AMF transmits the PDU session establishment Accept at step 908.

At step 909, after an expiry of the back off timer, the UE 100 does retransmit for the (Slice #2, DNN1) combination. In response to receiving the service request, the DNN2 determines that there is congestion at step 910. At step 911, the UE 100 transmits PDU session establishment request (Slice #2, DNN1) combination. As the congestion is resolved at the (Slice #2, DNN1) combination of the core network 200, the AMF transmits the PDU session establishment Accept at step 912.

Figure 10A:
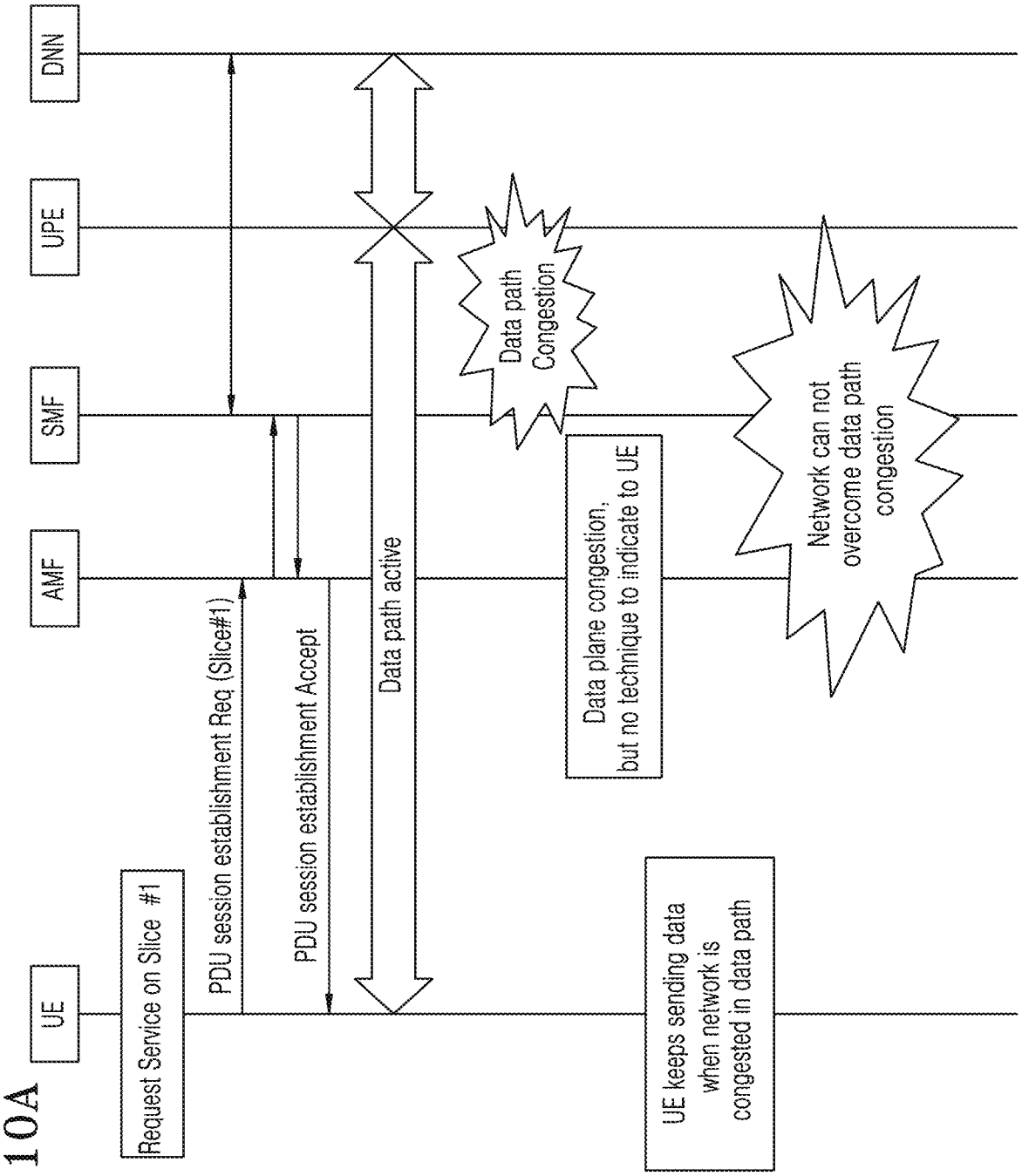
FIG. 10a is a sequence diagram illustrating a method of detecting the data path congestion between the slice and the DNN, according to a prior art.
Figure 10B:
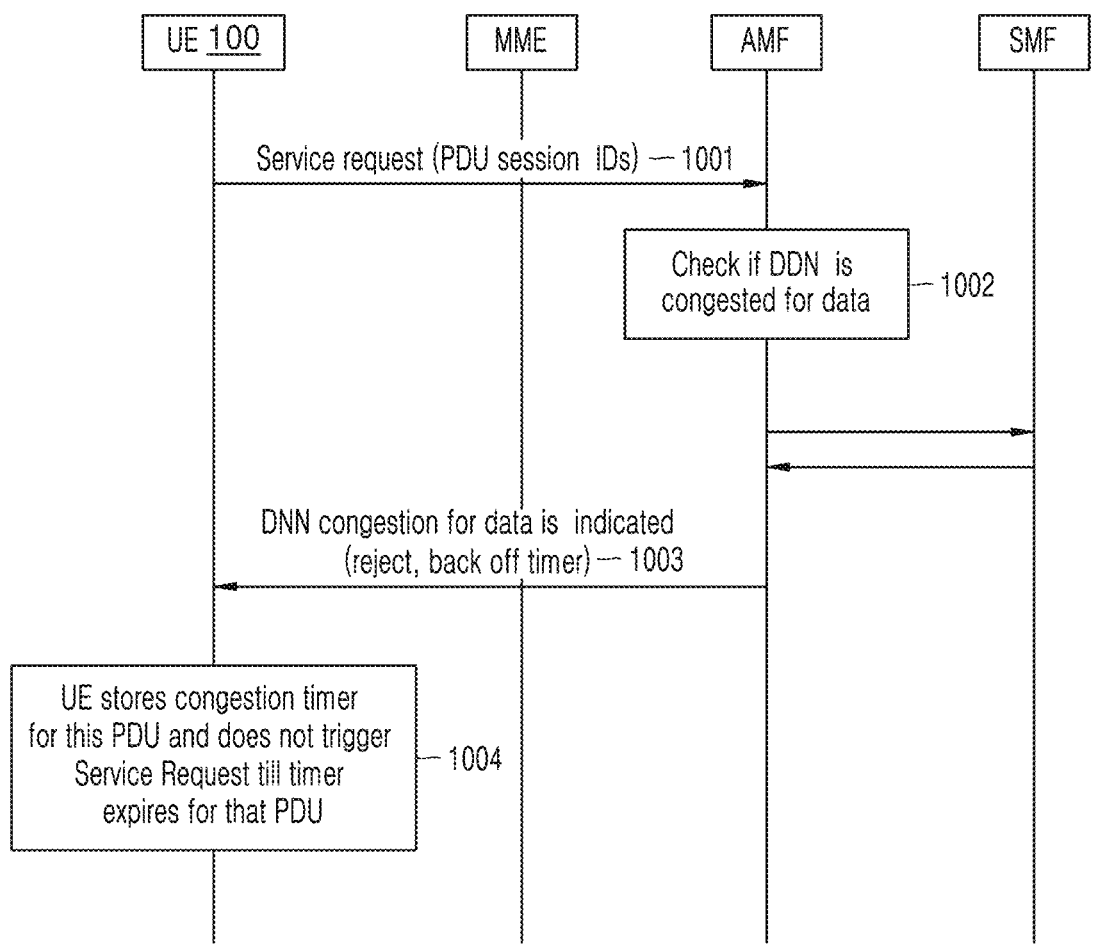
FIG. 10b is a sequence diagram illustrating a method of indicating the data path congestion between the slice and the DNN to the UE, according to an embodiment as disclosed herein.

FIG. 10b is a sequence diagram illustrating a method of indicating the data path congestion between the slice and the DNN to the UE 100, according to an embodiment as disclosed herein. The core network 200 indicates the congestion in the specific slice to the UE 100.

As shown in the FIG. 10b, the UE 100 configured to transmit a service request, where the service request includes PDU session IDs, at step 1001. In response to receiving the service request, the AMF determines that whether the DDN is congested for data at step 1002. Further, the AMF indicates that the DNN congestion for data along with reject cause and the back off timer at step 1003. In response to reject cause and the back off timer from the AMF, the UE 100 stores the back off timer for the PDU session ID and does not trigger service request till back off timer expires for that PDU session ID at step 1004.

Hence, the congestion has been defined for data plane resources. This results in avoids unnecessary signaling to the core network 200 for data bearer setup and thus saves power at the UE 100.

Figure 12:
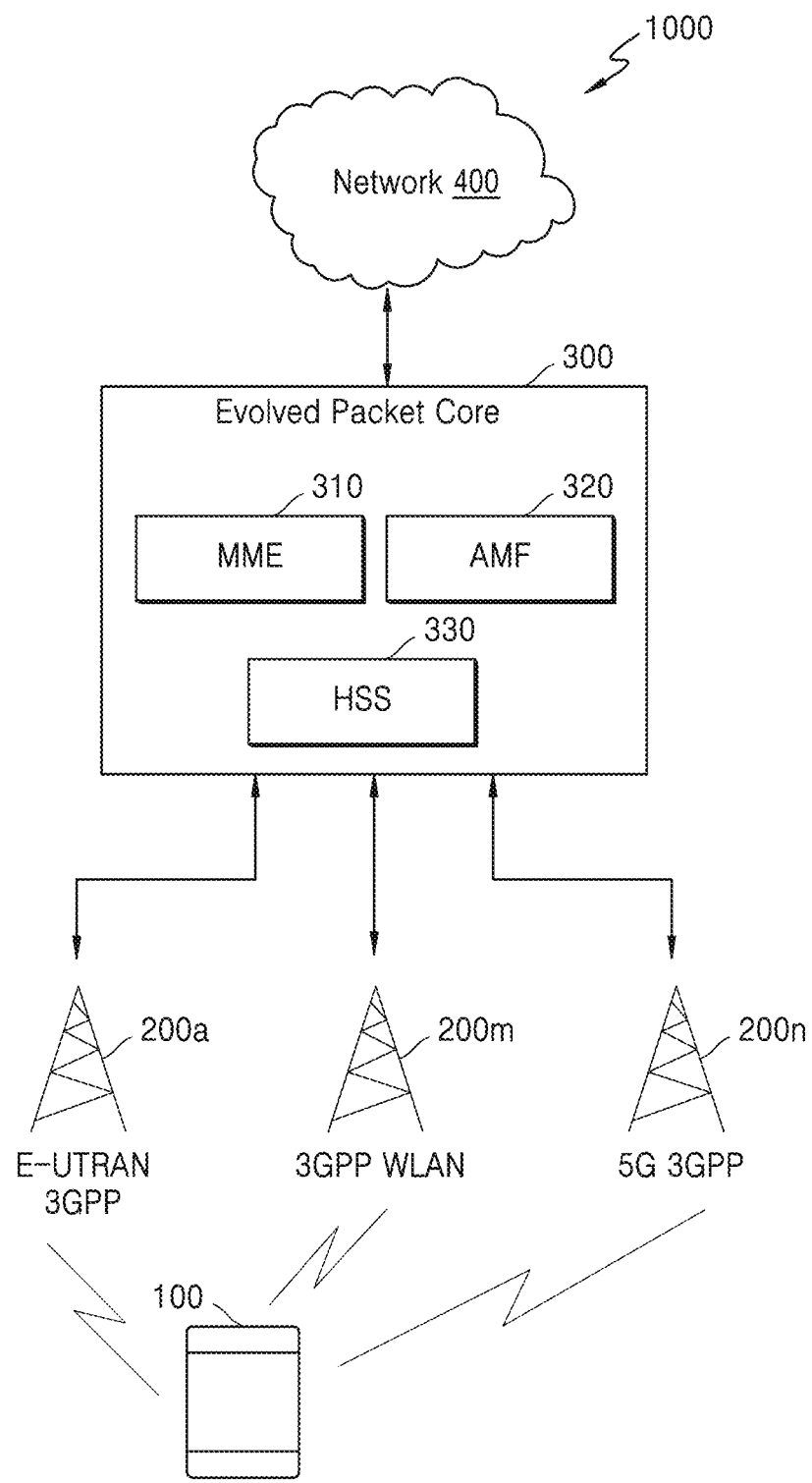
FIG. 12 is an architecture diagram of a wireless communication system, according to an embodiment as disclosed herein.

FIG. 12 is an architecture diagram of the wireless communication system 1000, according to an embodiment as disclosed herein. The wireless communication system 1000 includes a network 400, an Evolved Packet Core (EPC) 300, base station (200a-200c) and a UE 100. The network 400 can be a cellular network, for example a 3GPP Long Term Evolution (LTE) network such as an evolved universal terrestrial radio access technology (E-UTRAN), 4G, 5G. In another embodiment, the network 400 may be a Wireless Local Area Network (WLAN) such as an Institute of Electrical and Electronics Engineers (IEEE) 802.11 Wi-Fi network.

The UE 100 communicates with the network 400 for providing one or more data services to a user. In an example, the data service can be, for example, voice communication, text messaging, multimedia streaming, and Internet access. The UE 100 can be configured to access the network 400 via any one of 3GPP access network and a non-3GPP access network. The base station (200a-200c, hereinafter referred as 200) is a radio access network which allows the UE 100 to connect with the network 400. The radio access network can be for example a 3GPP access network and a non-3GPP access network. The UE 100 can access the 3GPP access network via base station 200a and 200b. Likewise, the UE 100 can access the non-3GPP access network via base station 200c. The 3GPP access network can be for example an Evolved-Universal Mobile Telecommunications System (UMTS) Terrestrial Radio access technology (E-UTRAN). For the 3GPP access network, the access information is specified in 3GPP specifications.

For non-3GPP, the access information were not specified in the 3GPP specifications. These technologies includes e.g. WiMAX, cdma2000®, WLAN or fixed networks. The non-3GPP access network can be for example Institute for Electrical and Electronics Engineers (IEEE) 802.16 (i.e., Worldwide Interoperability for Microwave Access (WiMAX)), CDMA2000, CDMA2000 IX, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The EPC 300 is referred as core network in the wireless communication system 1000. The EPC 300 may be referred to as 5G Core Network (5G CN), 5G Core (5GC), NextGen CN (NG CN), NGC, and variations thereof may be used interchangeably throughout this disclosure. The EPC 300 includes a MME 310, an Access Mobility Function (AMF) 320 and a HSS/UDM 330.

The MME 310 is configured to support an interworking procedure of the wireless communication system 1000. The MME 310 is configured to perform the signaling and control functions to support access to the network connection of the UE 100, assignment of network resources, paging, tracking, roaming and handover or the like. The MME 310 deals with the control plane functions related to subscriber and session management. Further, the MME manages a number of base stations, and performs the signaling for the selection of a conventional gateway for a handover to another 2G/3G network. The MME 310 handles the signaling related to mobility and security for E-UTRAN access. The MME 310 is responsible for the tracking and the paging of UE in idle-mode. The MME 310 is the termination point of the Non-Access Stratum (NAS).

The AMF 320 supports the following functions:
 a. Termination of NAS signaling,
 b. NAS ciphering & integrity protection,
 c. Registration management,
 d. Connection management,
 e. Mobility management,
 f. Access authentication and authorization, and
 g. Security context management.

In an embodiment, the AMF 320 has part of the MME functionality from EPC 300.

The HSS/UDM 330 is a database that contains all the user subscription information, including user identification information such as International Mobile Subscriber Identity (IMSI), Mobile Subscriber ISDN Number (MSISDN), or mobile telephone number, and user profile information that includes service subscription states and user-subscribed Quality of Service information. The HSS/UDM 330 may provide the authentication and security information for the UE 100.

In an embodiment, the UE 100 can access the network 400 using a single registration mode or a dual registration mode in the wireless communication system 1000.

In the conventional methods, there is no mechanism for handling what will be the UE 100 and the network 400 behavior when PDN interworking is not there between the 4G network and the 5G network. Also, what will be the network behavior when say certain PDU are not supported in one RAT is not described in the conventional methods. The UE behavior for the case when network supports registration on one access and not on other access.

Unlike conventional methods and systems, the proposed method indicates that there should be a field in a SIM card or network slice selection policy file which should indicate the RAT where PDU is supported based on interworking RAT could be 4G, 5G, Non-3GPP or their combination. If the UE 100 doesn't have subscription for the registration to certain access, then the network 400 should give subscription based the reject cause. The reject cause can include the access where the registration is allowed or not allowed. The reject cause can include only 3GPP Access allowed, only Non-3GPP access allowed. This subscription information shall also be maintained in the SIM card which can give information that on which access subscription is there, only 3GPP access, only Non-3GPP access or both are allowed.

Further, if the UE 100 does not have subscription for the PDUs to certain access, then the network 400 should give subscription-based reject cause for PDN connectivity request reject cause can include the access where registration is allowed or not allowed. The reject cause can include, for e.g., only 3GPP access allowed, only non-3GPP access allowed, or none are allowed. This subscription information for PDUs shall also be maintained in the SIM card which can give information that on which access subscription is there, only 3GPP access, only non-3GPP access or both are allowed.

Figure 13:
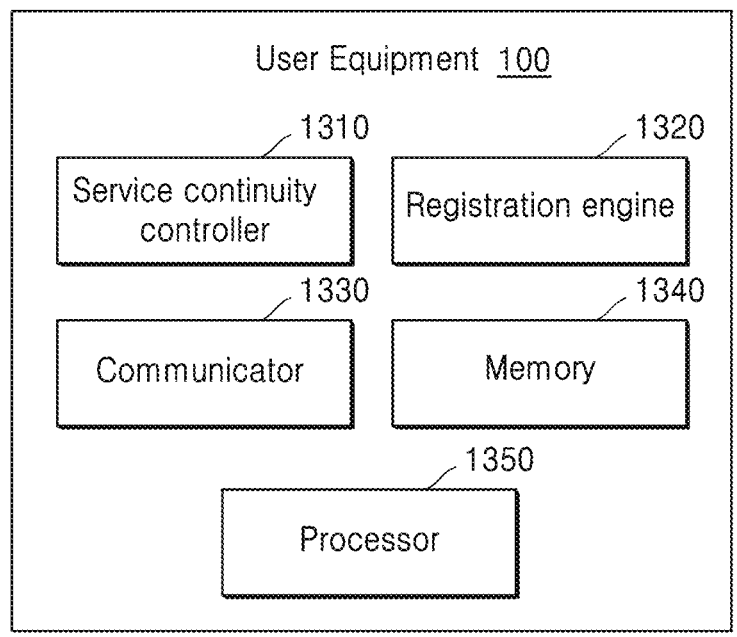
FIG. 13 is a block diagram of the UE for handling dual registration in the wireless communication system, according to an embodiment as disclosed herein.

FIG. 13 is a block diagram of the UE 100, according to an embodiment as disclosed herein. In an embodiment, the UE 100 includes a service continuity controller 1310, a registration engine 1320, a communicator 1330, a memory 1340, and a processor 1350.

In an embodiment, the service continuity controller 1310 detects a change in location during mobility from a first radio access network 200*a* to a second radio access network 200*b*. In an embodiment, within the first radio access network 200*a*, the UE 100 may move from one location to another location which causes the UE to switch from one RAT to another RAT in the first radio access network 200*a* itself.

In an embodiment, the service continuity controller 1310 initiates an attach request procedure to the MME 310*b*. The service continuity controller 1310 sends an attach request message includes other registered RAT information to a Mobility Management Entity (MME) 310*b* associated with the second radio access network 200*b*. The other registered RAT information includes one or more radio access technology subscribed by the UE 100 for one or more services.

In an embodiment, the first radio access network 200*a* and the second radio access network 200*b* includes at least one of a 3rd Generation Partnership Project (3GPP) access network and a non-3GPP access network. The 3GPP access network is at least one of a Long-Term Evolution (LTE) network and a New Radio (NR) network.

In an embodiment, the service continuity controller 1310 maintains the service continuity by retaining the other registered RAT information of the UE 100 associated with the second radio access network 200*b*.

In an embodiment, the registration engine 120 is operably coupled with the memory 1340 and the processor 1350. The registration engine 1320 is configured to determine that the UE 100 supports dual registration on different RATs when Nx (N26) interface is available. Further, the registration engine 1320 is configured to receive a registration accept message from an Access and Mobility Management Function (AMF) entity, wherein the registration accept message indicates the UE 100 to support a single registration. Furthermore, the registration engine 1320 is configured to operate the UE 100 in the dual registration even the registration accept message indicates the UE 100 to support the single registration.

In an embodiment, the communicator 130 is configured to communicate internally between hardware components in the UE 100. In an embodiment, the processor 150 is configured to process various instructions stored in the memory 140 for handling the service continuity in the wireless communication system.

The memory 1340 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 140 may, in some examples, be considered a non-transitory storage medium. The term "non-transitory" may indicate that the storage medium is not embodied in a carrier wave or a propagated signal. However, the term "non-transitory" should not be interpreted that the memory 140 is non-movable. In some examples, the memory 140 can be configured to store larger amounts of information than the memory. In certain examples, a non-transitory storage medium may store data that can, over time, change (e.g., in Random Access Memory (RAM) or cache).

Although the FIG. 13 shows various hardware components of the UE 100, but it is to be understood that other embodiments are not limited thereon. In other embodiments, the UE 100 may include less or more number of components. Further, the labels or names of the components are used only for illustrative purpose and does not limit the scope of the invention. One or more components can be combined together to perform same or substantially similar function of maintaining the service continuity in the wireless communication system.

Figure 14:
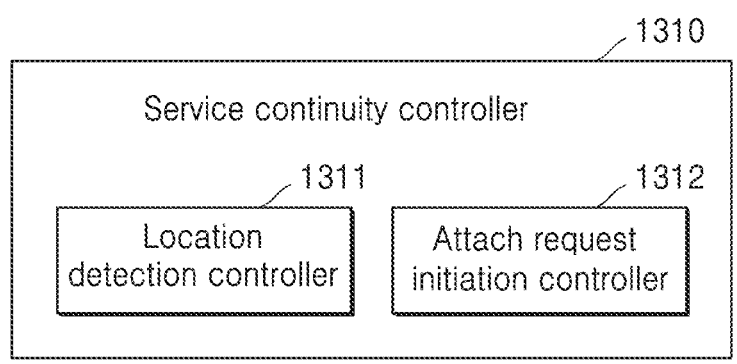
FIG. 14 is a block diagram of a service continuity controller of the UE, according to an embodiment as disclosed herein.

FIG. 14 is a block diagram of the service continuity controller 1310 of the UE 100, according to an embodiment as disclosed herein. In an embodiment, the service continuity controller 1310 includes a location detection controller 1311 and an attach request initiation controller 1312.

In an embodiment, the location detection controller 1311 is configured to detect a change in the location during the mobility from the first radio access network 200*a* to the second radio access network 200*b*.

In an embodiment, the attach request initiation controller 1312 is configured to initiate the attach request procedure to the MME 310*b*. The service continuity controller 1310 sends an attach request message includes other registered RAT information to the Mobility Management Entity (MME) 310*b* associated with the second radio access network 200*b*.

Figure 15:
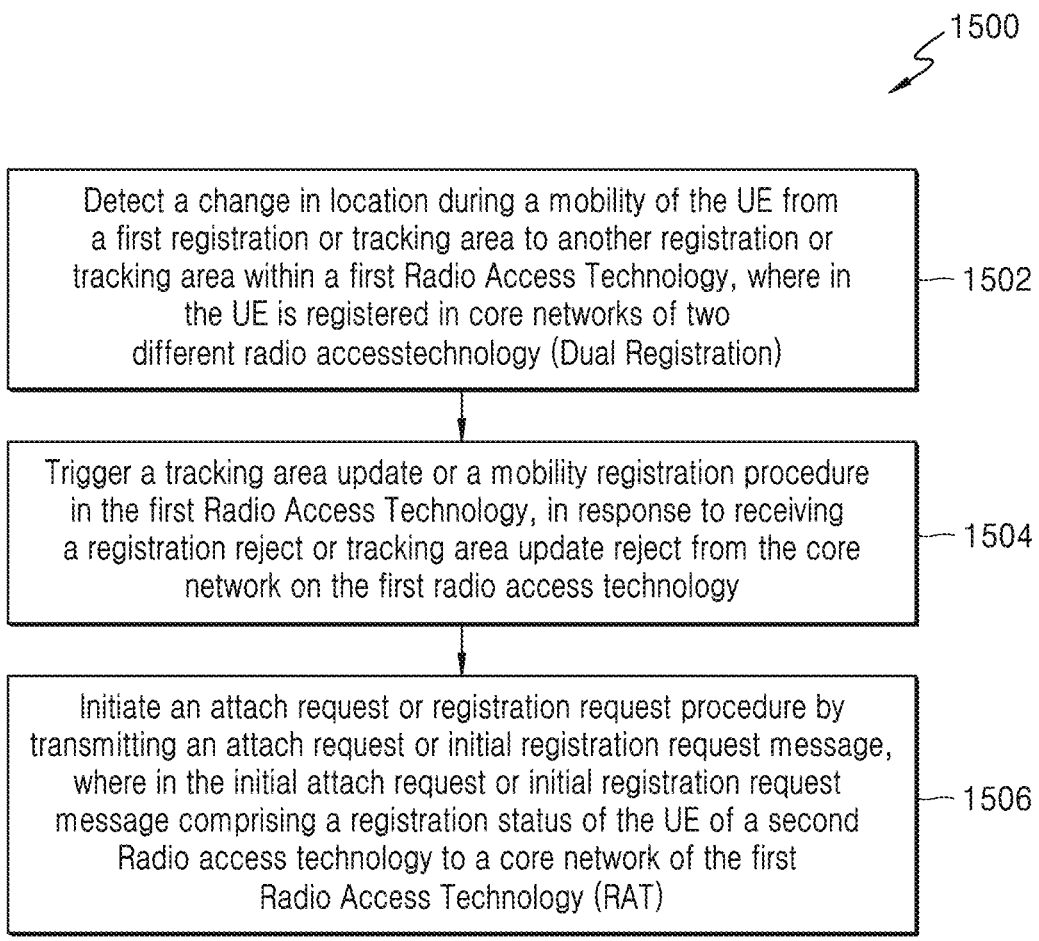
FIG. 15 is a flow diagram illustrating various operations for maintaining a service continuity by the UE in the wireless communication system, according to an embodiment as disclosed herein.

FIG. 15 is a flow diagram 1500 illustrating various operations for maintaining the service continuity by the UE 100 in the wireless communication system 1000, according to an embodiment as disclosed herein.

At step 1502, the method includes detecting, by the UE 100, the change in location during mobility of the UE 100 from a first registration or tracking area to another registration or tracking area within a first Radio Access Technology, wherein the UE 100 is registered in core networks of two different radio access technology (Dual Registration). In an embodiment, the method allows the location detection controller 1311 to detect the change in location during a mobility of the UE 100 from a first registration or tracking area to another registration or tracking area within a first Radio Access Technology, wherein the UE 100 is registered in core networks of two different radio access technologies (Dual Registration).

At step 1504, the method includes triggering, by the UE 100, a tracking area update or a mobility registration procedure in the first Radio Access Technology on detecting the change in the location. In an embodiment, the method allows the location detection controller 1311 to trigger the tracking area update or a mobility registration procedure in the first Radio Access Technology on detecting the change in the location.

At step 1506, the method includes receiving the registration reject or tracking area update reject from the core network on the first radio access technology. In an embodiment, the method allows the location detection controller 1311 to receive the registration reject or tracking area update reject from the core network on the first radio access technology.

The method includes initiating, by the UE 100, an attach request or registration request procedure by transmitting an attach request or initial registration request message, wherein the initial attach request or initial registration request message comprising a registration status of the UE 100 of a second Radio access technology to a core network of the first Radio Access Technology (RAT). In an embodiment, the method allows the attach request initiation controller 1312 to initiate an attach request or registration request procedure by transmitting an attach request or initial registration request message, wherein the initial attach request or initial registration request message comprising a registration status of the UE of a second Radio access technology to a core network of the first Radio Access Technology (RAT).

The various actions, acts, blocks, steps, or the like in the flow diagram 1500 may be performed in the order presented, in a different order or simultaneously. Further, in some embodiments, some of the actions, acts, blocks, steps, or the like may be omitted, added, modified, skipped, or the like without departing from the scope of the invention.

Figure 16A:
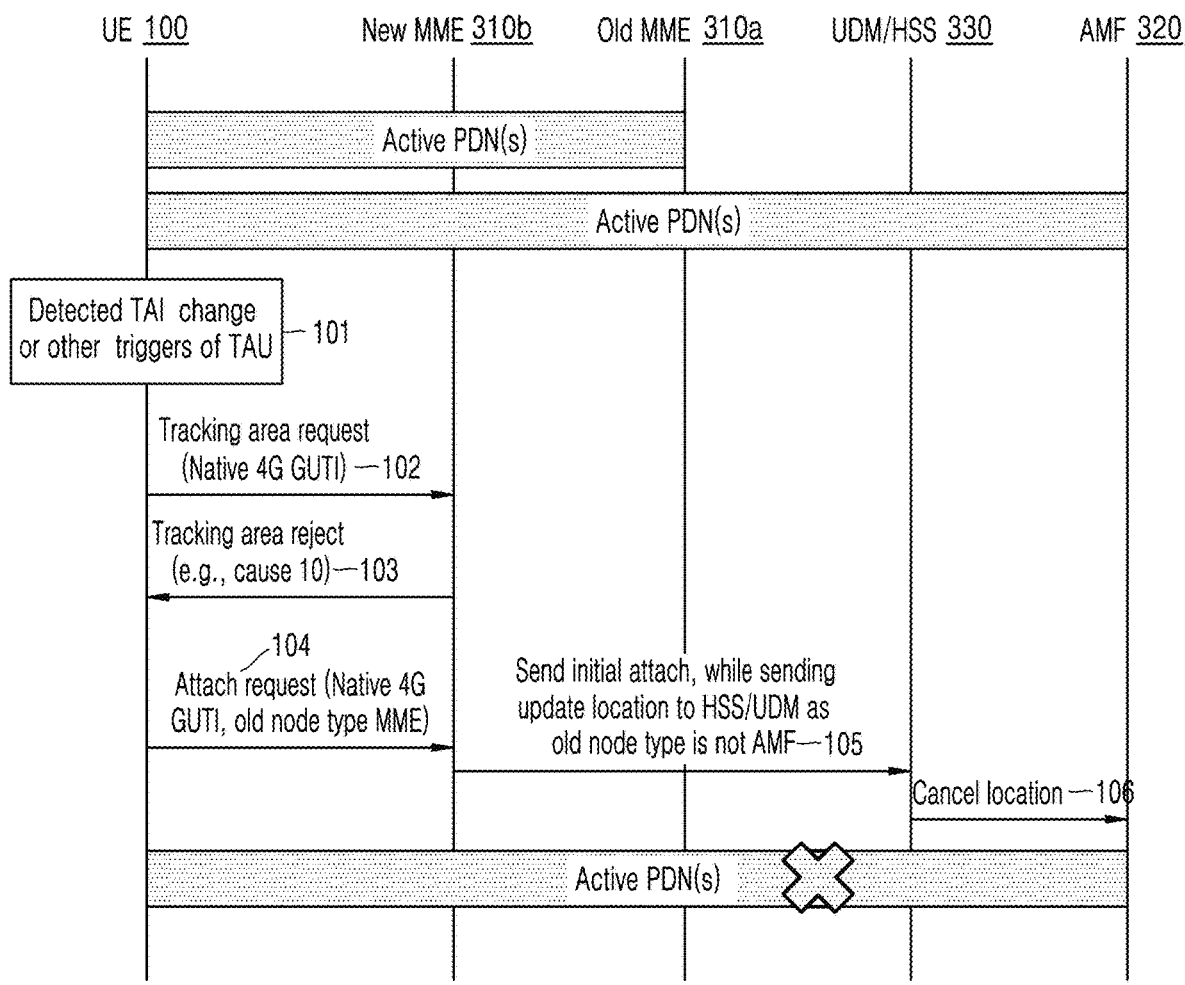
FIG. 16a is a sequence diagram illustrating a method of receiving a registration failure message (e.g., temporary rejection) from the MME during registration, according to a prior art.
Figure 16B:
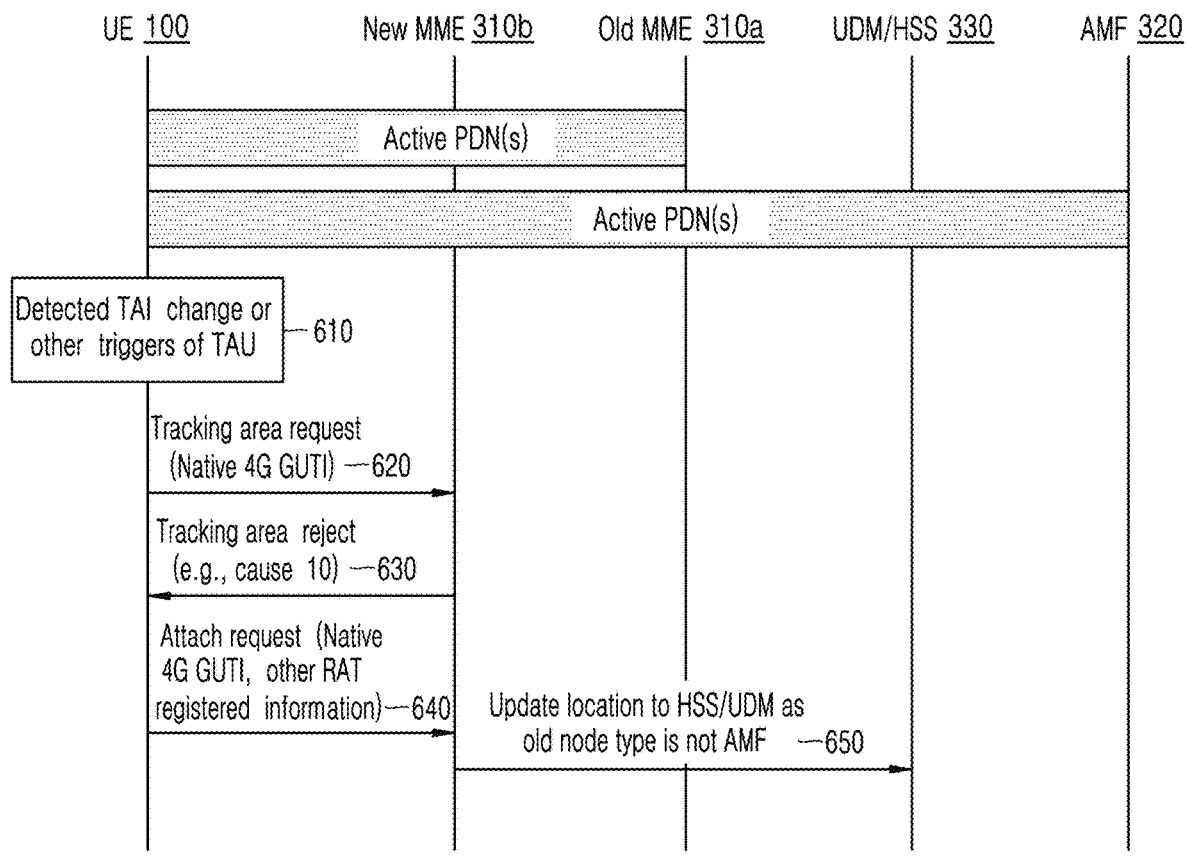
FIG. 16b is a sequence diagram illustrating a method of maintaining the service continuity by the UE in the wireless communication system, according to an embodiment as disclosed herein.

FIG. 16*b* is a sequence diagram illustrating a method of maintaining the service continuity by the UE 100 in the wireless communication system 1000, according to an embodiment as disclosed herein. As shown in the FIG. 16*b*, the UE 100 is registered in the dual-mode registration, in which the UE 100 can access the 3GPP access network (such as 5G) and the non-3GPP access network (such as 5G WI-FI connection) using the old MME 310*a*. In an embodiment, if the UE 100 moves to a new tracking area within a 5G coverage area then, the UE 100 detects the change in the tracking area at step 610. In another embodiment, if the UE 100 moves to the new tracking area within the 5G coverage area then, the UE 100 and may receive a trigger of TAU at step 610. In response to the detection, the UE 100 sends a Tracking Area Request (TAR) attach request to a new MME 310*b* at step 620.

Further, the new MME 310*b* may send a tracking area reject/implicit detach to the UE 100, in response to receiving the TAR attach request at step 630. As the 5G identity of the UE 100 is still valid, the UE 100 may send an attach request with a native 5G GUTI details to the new MME 310*b* at step 640. The attach request includes the Globally Unique Temporary Identifier (GUTI) value associated with the old MME 310*a* and another registered RAT information. The UE 100 may update a location to HS S/UDM 330 by Registration Request or Attach Request through AMF/MME 320 at step 650. Accordingly, the MME 310*b* may update a new location of the UE 100 based on a user-related and subscriber-related information from the HSS/UDM 330, as the UE 100 moves from one tracking area to another tracking area.

In an embodiment, consider a scenario in which the UE 100 is registered in dual-mode registration, in which the UE 100 can access the 3GPP access network (such as 4G) and the non-3GPP access network (such as 5G WI-FI connection) using the old MME 310*a*. During initial registration itself, the UE 100 is configured to indicate on a given RAT (for e.g., 4G) that the UE 100 is also registered on alternate RAT (for e.g., 5G) to the new MME 310*b*. If the new MME 310*b* receives the information that the UE 100 is registered in the 5G/non-3GPP (AMF) then, the new MME 310*b* may not include an initial attach indication towards the UDM/HSS 310. Further, the UDM/HSS 310 does not delete the PDUs of 5G connection/non-3GPP access network.

Figure 17:
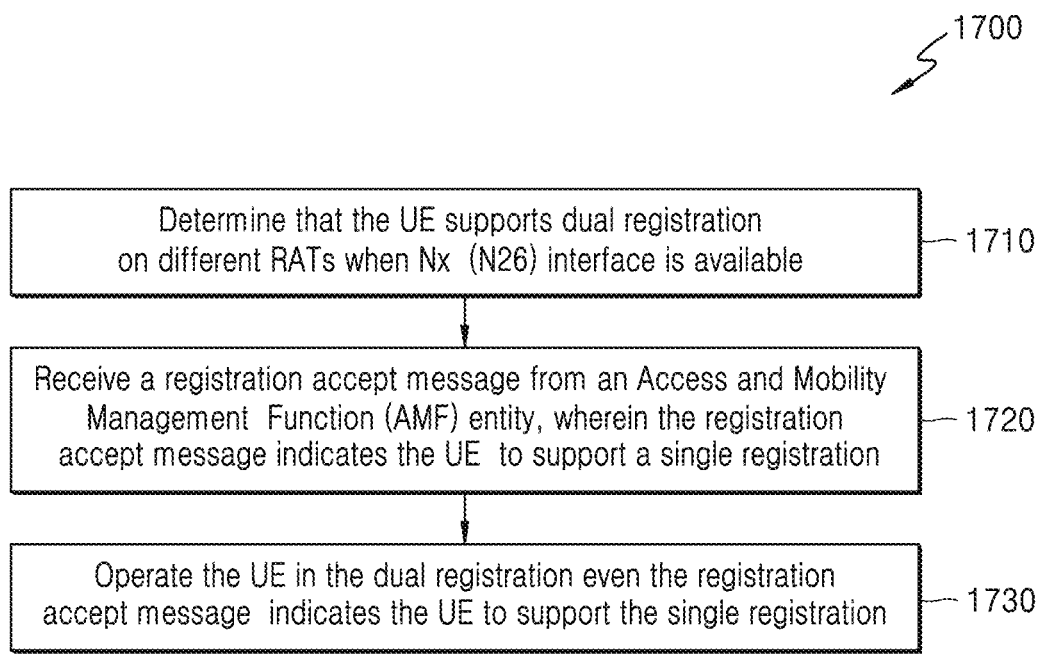
FIG. 17 is a flow diagram illustrating various operations for handling dual registration by the UE in the wireless communication system, according to an embodiment as disclosed herein.

FIG. 17 is a flow diagram 1700 illustrating various operations for handling dual registration by the UE 100 in the wireless communication system 1000, according to an embodiment as disclosed herein.

At 1710, the method includes determining that the UE 100 supports dual registration on different RATs when Nx (N26) interface is available. In an embodiment, the method allows registration engine 120 to determine that the UE 100 supports dual registration on different RATs when Nx (N26) interface is available.

At 1720, the method includes receiving the registration accept message from an Access and Mobility Management Function (AMF) entity, where the registration accept message indicates the UE to support the single registration. In an embodiment, the method allows registration engine 120 to receive the registration accept message from an Access and Mobility Management Function (AMF) entity, where the registration accept message indicates the UE to support the single registration.

At 1730, the method includes operating the UE 100 in the dual registration in response to receiving the registration accept message indicating the UE to support the single registration. In an embodiment, the method allows registration engine 120 to operate the UE 100 in the dual registration in response to receiving the registration accept message indicating the UE to support the single registration.

Figure 18A:
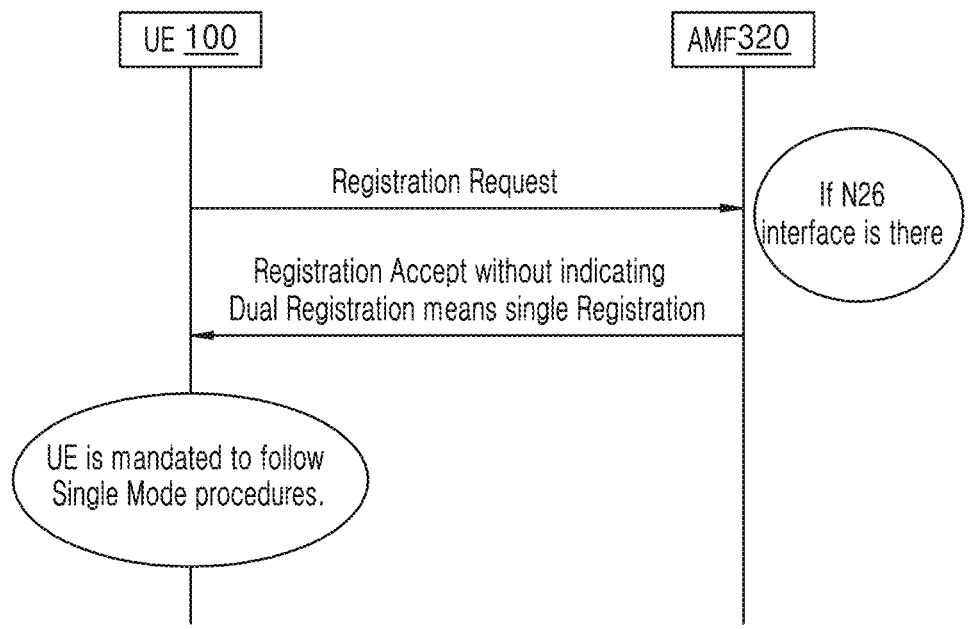
FIG. 18a is a scenario of registration accept without indicating dual registration, according to prior art.

FIG. 18*a* is a scenario of registration accept without indicating dual registration, according to prior art.

As shown in the FIG. 18*a*, the UE 100 sends the registration request to the AMF 320. If N26 interface is there and the AMF 320 sends the registration accept without indicating dual registration to the UE 100 and the UE 100 is mandated to follow single mode procedures.

Figure 18B:
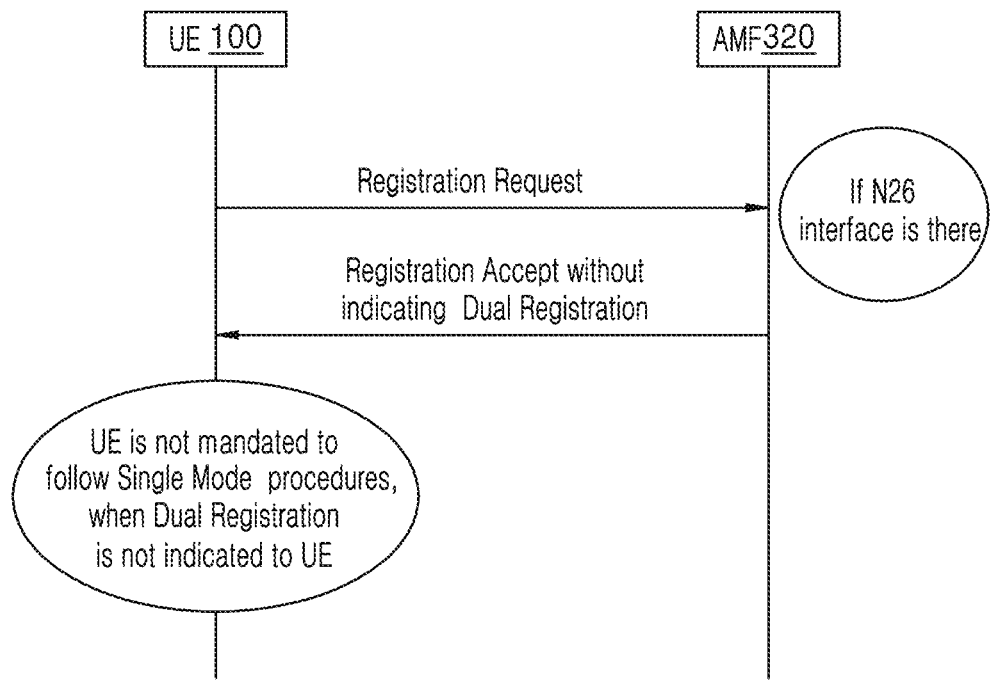
FIG. 18b is a scenario of registration accept without indicating dual registration, according to an embodiment as disclosed herein.

FIG. 18*b* is a scenario of registration accepts without indicating dual registration, according to an embodiment as disclosed herein.

As shown in the FIG. 18b, at 1, the UE 100 sends the registration request to the AMF 320. If N26 interface is there and the AMF 320 sends the registration accept without indicating dual registration to the UE 100. Further, the registration engine 120 allows the UE 100 to obviate mandated the use of single registration when the dual registration is not indicated to the UE 100. Further, the dual registration can be used with the dual radio case even when the single registration is supported by the network.

Figure 19:
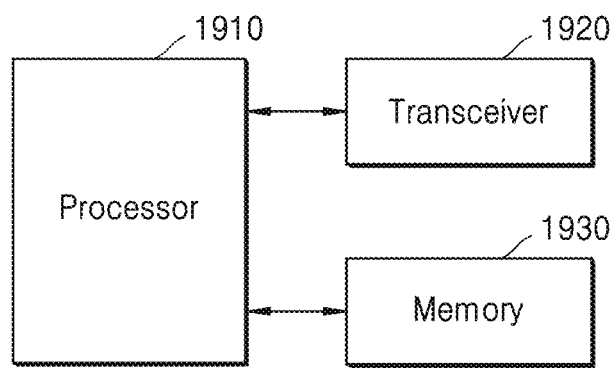
FIG. 19 is a block diagram illustrating the structure of a user equipment according to another embodiment of the present disclosure.

FIG. 19 is a block diagram illustrating the structure of a user equipment according to another embodiment of the present disclosure.

Referring to the FIG. 19, the user equipment 1900 may include a processor 1910, a transceiver 1920 and a memory 1930. However, all of the illustrated components are not essential. The user equipment 1900 may be implemented by more or less components than those illustrated in FIG. 19. In addition, the processor 1910 and the transceiver 1920 and the memory 1930 may be implemented as a single chip according to another embodiment. The processor 1910 may correspond to a Processor 150 of FIG. 13. The transceiver 1920 may correspond to a Communicator 130 of FIG. 3. The memory 1930 may correspond to Memory 140.

The aforementioned components will now be described in detail.

The processor 1910 may include one or more processors or other processing devices that control the proposed function, process, and/or method. Operation of the user equipment 1900 may be implemented by the processor 1910.

The processor 1910 may sense each configured resource pool and/or each group of resources to obtain a result of sensing, the result of sensing containing a set of remaining candidate single TU resources of each resource pool. The processor 910 may select, from the set of remaining candidate single TU resources of each resource pool and/or each group of resources, one candidate single TU resource as a transmission resource.

The transceiver 1920 may include a RF transmitter for up-converting and amplifying a transmitted signal, and a RF receiver for down-converting a frequency of a received signal. However, according to another embodiment, the transceiver 920 may be implemented by more or less components than those illustrated in components.

The transceiver 1920 may be connected to the processor 1910 and transmit and/or receive a signal. The signal may include control information and data. In addition, the transceiver 1920 may receive the signal through a wireless channel and output the signal to the processor 1910. The transceiver 1920 may transmit a signal output from the processor 1910 through the wireless channel.

The memory 1930 may store the control information or the data included in a signal obtained by the device 900. The memory 1930 may be connected to the processor 1910 and store at least one instruction or a protocol or a parameter for the proposed function, process, and/or method. The memory 1930 may include read-only memory (ROM) and/or random access memory (RAM) and/or hard disk and/or CD-ROM and/or DVD and/or other storage devices.

Figure 20:
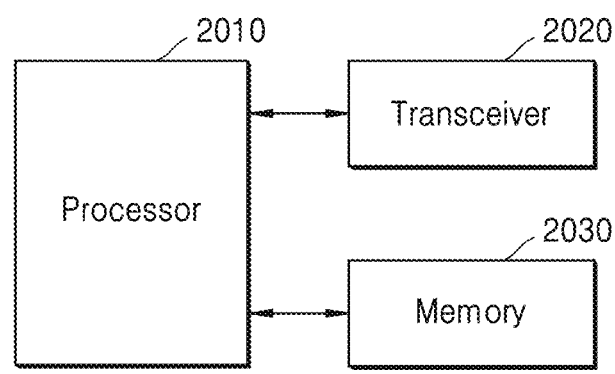
FIG. 20 is a block diagram illustrating the structure of a base station according to another embodiment of the present disclosure.

FIG. 20 is a block diagram illustrating the structure of a base station according to another embodiment of the present disclosure.

Referring to the FIG. 20, the base station 2000 may include a processor 2010, a transceiver 2020 and a memory 2030. However, all of the illustrated components are not essential. The base station 2000 may be implemented by more or less components than those illustrated in FIG. 10. In addition, the processor 2010 and the transceiver 2020 and the memory 2030 may be implemented as a single chip according to another embodiment.

The aforementioned components will now be described in detail.

The processor 2010 may include one or more processors or other processing devices that control the proposed function, process, and/or method. Operation of the base station 2000 may be implemented by the processor 2010.

The processor 2010 may determine the locations of transmission resources and reception resources.

The transceiver 2020 may include a RF transmitter for up-converting and amplifying a transmitted signal, and a RF receiver for down-converting a frequency of a received signal. However, according to another embodiment, the transceiver 2020 may be implemented by more or less components than those illustrated in components.

The transceiver 2020 may be connected to the processor 210 and transmit and/or receive a signal. The signal may include control information and data. In addition, the transceiver 2020 may receive the signal through a wireless channel and output the signal to the processor 2010. The transceiver 2020 may transmit a signal output from the processor 210 through the wireless channel.

The memory 2030 may store the control information or the data included in a signal obtained by the device 2000. The memory 2030 may be connected to the processor 2010 and store at least one instruction or a protocol or a parameter for the proposed function, process, and/or method. The memory 2030 may include read-only memory (ROM) and/or random access memory (RAM) and/or hard disk and/or CD-ROM and/or DVD and/or other storage devices.

The embodiments disclosed herein can be implemented through at least one software program running on at least one hardware device and performing network management functions to control the elements. The elements shown in the FIG. 4 to FIG. 7, FIG. 8b, FIG. 9b, FIG. 10b, FIG. 12 to FIG. 15, FIG. 16b to FIG. 17, FIG. 18b, FIG. 19, and FIG. 20 include blocks which can be at least one of a hardware device, or a combination of hardware device and software module.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method performed by a network entity, the method comprising:
receiving, from a user equipment (UE), a service request message including a protocol data unit (PDU) session identifier (ID) for a PDU session; and
transmitting a reject message to the UE, based on the received service request message,
wherein the transmitting of the reject message comprises:
in case that a network slice associated with the PDU session is detected as congested based on the received service request message, transmitting a first reject message for the network slice, and in case that the network slice and a data network name (DNN) associated with the PDU session are detected as congested based on the received service request message, transmitting a second reject message for the network slice and the DNN, and wherein the second reject message includes a value of a back-off timer for the network slice and the DNN.

2. The method of claim 1, wherein the first reject message for the network slice includes a value of a back-off timer for the network slice.

3. The method of claim 2, wherein a session management procedure for the network slice is not performed, based on the back-off timer for the network slice, and wherein a session management procedure for a combination of the network slice and the DNN is not performed, based on the back-off timer for the network slice and the DNN.

4. The method of claim 1, wherein in case that the network slice is detected as congested, the first reject message further includes a value indicating that the first reject message is caused for the network slice, and wherein in case that the network slice and the DNN are detected as congested, the second reject message further includes a value indicating that the second reject message is caused for the network slice and the DNN.

5. The method of claim 2, wherein at least one signaling message is not transmitted from the UE until the back-off timer for the network slice or the back-off timer for the network slice and the DNN expires.

6. A network entity comprising:

a transceiver; and at least one processor coupled with the transceiver and configured to:

receive, from a user equipment (UE), a service request message including a protocol data unit (PDU) session identifier (ID) for a PDU session, and transmit a reject message to the UE, based on the received service request message, wherein the transmitting of the reject message comprises:

in case that a network slice associated with the PDU session is detected as congested based on the received service request message, transmitting a first reject message for the network slice, and in case that the network slice and a data network name (DNN) associated with the PDU session are detected as congested based on the received service request message, transmitting a second reject message for the network slice and the DNN, and wherein the second reject message includes a value of a back-off timer for the network slice and the DNN.

7. The network entity of claim 6, wherein the first reject message for the network slice includes a value of a back-off timer for the network slice.

8. The network entity of claim 7, wherein a session management procedure for the network slice is not performed, based on the back-off timer for the network slice, and wherein a session management procedure for a combination of the network slice and the DNN is not performed, based on the back-off timer for the network slice and the DNN.

9. The network entity of claim 6, wherein in case that the network slice is detected as congested, the first reject message further includes a value indicating that the first reject message is caused for the network slice, and wherein in case that the network slice and the DNN are detected as congested, the second reject message further includes a value indicating that the second reject message is caused for the network slice and the DNN.

10. The network entity of claim 7, wherein at least one signaling message is not transmitted from the UE until the back-off timer for the network slice or the back-off timer for the network slice and the DNN expires.

* * * * *